United States Patent
Marrone et al.

(10) Patent No.: US 11,206,832 B2
(45) Date of Patent: Dec. 28, 2021

(54) HERBICIDAL COMPOUND

(71) Applicant: Marrone Bio Innovations, Inc., Davis, CA (US)

(72) Inventors: Pamela Marrone, Davis, CA (US); Amit Vasavada, Davis, CA (US); Louis Boddy, Davis, CA (US); Ratnakar Asolkar, Davis, CA (US); Gian Oddone, Davis, CA (US)

(73) Assignee: Marrone Bio Innovations, Inc., Davis, CA (US)

( * ) Notice: Subject to any disclaimer, the term of this patent is extended or adjusted under 35 U.S.C. 154(b) by 0 days.

(21) Appl. No.: 16/638,019

(22) PCT Filed: Sep. 6, 2018

(86) PCT No.: PCT/US2018/049670
§ 371 (c)(1),
(2) Date: Feb. 10, 2020

(87) PCT Pub. No.: WO2019/051029
PCT Pub. Date: Mar. 14, 2019

(65) Prior Publication Data
US 2020/0214297 A1     Jul. 9, 2020

Related U.S. Application Data

(60) Provisional application No. 62/556,159, filed on Sep. 8, 2017.

(51) Int. Cl.
*A01N 43/90* (2006.01)
*A01N 63/20* (2020.01)
*A01P 13/00* (2006.01)

(52) U.S. Cl.
CPC ............ *A01N 43/90* (2013.01); *A01N 63/20* (2020.01); *A01P 13/00* (2021.08)

(58) Field of Classification Search
CPC .......... A01N 43/90; A01N 63/20; A01P 13/00
See application file for complete search history.

(56) References Cited

U.S. PATENT DOCUMENTS

| | | | |
|---|---|---|---|
| 8,822,193 B2* | 9/2014 | Asolkar et al. | A01N 63/02 435/252.1 |
| 2008/0096879 A1 | 4/2008 | Koide et al. | |
| 2011/0207604 A1* | 8/2011 | Asolkar et al. | A01N 63/00 504/100 |

OTHER PUBLICATIONS

Albert, Brian J., "Synthetic Chemical, and Biological Studies of FR901464 and Studies of the Silver and Zirconium Promoted Alkynyl Addition Reaction," University of Pittsburgh, 2007, pp. 1-409.
Eustaquio, Alessandra S. et al., "Spliceostatin hemiketal biosysthesis in Burkholderia spp. is catalyzed by an iron/α-ketoglutarate-dependent dioxygenase," PNAS, Aug. 5, 2014, pp. E3376-E3385.
Ghosh, Arun K. et al., "Enantioselective Total Syntheses of FR901464 and Spliceostatin A and Evaluation of Splicing Activity of Key Derivatives," The Journal of Organic Chemistry 2014, 79, pp. 5697-5709.
Liu, Xiangyang, "Generate a bioactive natural product library by mining bacterial cytochrome P450 patterns," Synthetic and Systems Biotechnology 1 (2016), pp. 95-108.
Watanabe, H. et al., "Tetrahedron Lett., FR901464 (TKGP-090307)" 42, 8207 (2001), pp. 1-2.
H. He et al.; "Cytotixic Spliceostatins from *Burkholderia* sp. and Their Semisynthetic Analogues"; J. Nat. Prod. Apr. 16, 2014; pp. 1-7.
S. Osman et al.; "Structural Requirements for the Antiproliferative Activity of Pre-mRNA Splicing Inhibitor FR901464"; Chemistry Jan. 17, 2011; 17(3): 895-904.
Rj Van Alphen et al.; "The spliceosome as target for anticancer treatment"; British Journal of Cancer (2009) 100, pp. 228-232.
X. Liu et al.; "Genomics-Guided Discovery of Thailanstatins A, B and C as Pre-mRNA Splicing Inhibitors and Antiproliferative Agents from Burkholderia thailandensis MSMB43"; J. Nat. Prod. Apr. 26, 2013; 76(4): 685-693.

* cited by examiner

*Primary Examiner* — Sue X Liu
*Assistant Examiner* — Andriae M Holt
(74) *Attorney, Agent, or Firm* — Singleton Law, PLLC; Chainey P. Singleton; Ying-Horng Liu

(57) ABSTRACT

The present disclosure relates to FR901464 and/or spliceostatin C compounds and their use as herbicides. Moreover, the invention relates to compositions for crop protection and to a method for controlling unwanted vegetation.

11 Claims, 11 Drawing Sheets

HERBICIDAL COMPOUND

CROSS-REFERENCE TO RELATED APPLICATIONS

This application claims priority to, and is the National Stage of International Application No. PCT/US2018/0049670 filed on Sep. 6, 2018 and claims the benefit under 35 U.S.C. § 119(e) of U.S. Provisional Application No. 62/556,159, filed Sep. 8, 2017, both of which are hereby incorporated by reference in their entirety.

TECHNICAL FIELD OF THE INVENTION

The present disclosure generally relates to a new method of use for FR901464 and/or spliceostatin C which are known to be used as an antibacterial agent and an antitumor agent. More particularly, it relates to methods, compositions, and metabolites for controlling and inhibiting emergence and/or growth of monocotyledonous, sedge or dicotyledonous weeds.

STATEMENT OF FEDERALLY FUNDED RESEARCH

None.

INCORPORATION-BY-REFERENCE OF MATERIALS FILED ON COMPACT DISC

None.

BACKGROUND OF THE INVENTION

Natural products are substances produced by microbes, plants, and other organisms. Microbial natural products offer an abundant source of chemical diversity, and there is a long history of utilizing natural products for pharmaceutical purposes. A couple of such compounds are FR901464 and spliceostatin C that have been found to be useful as an antibacterial agent and antitumor agent. These compounds are ultrapotent inhibitors of eukaryotic RNA splicing, via binding to the SF3b subunit of the U2 snRNA subcomplex, an essential component of the spliceosome.

SUMMARY OF THE INVENTION

Provided herein is a method for controlling weeds by applying an effective amount of a) a compound having the general formula (I)

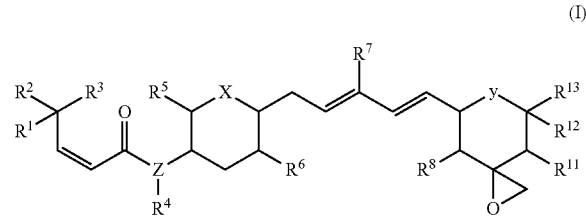

(I)

wherein X, Y and Z are each independently —O—, —NR, or —S, wherein R is H or $C_1$-$C_{10}$alkyl; $R_1$, $R_2$, $R_3$, $R_4$, $R_5$, $R_6$, $R_7$, $R_8$, $R_{11}$, $R_{12}$, and $R_{13}$ are each independently H, alkyl, substituted alkyl, alkyl carboxylate acid, alkenyl, substituted alkenyl, alkynyl, substituted alkynyl, aryl, substituted aryl, heteroaryl, substituted heteroaryl, heterocyclic, substituted heterocyclic, cycloalkyl, substituted cycloalkyl, alkoxy, substituted alkoxy, thioalkyl, substituted thioalkyl, hydroxy, halogen, amino, amido, carboxyl, —C(O)H, acyl, oxyacyl, carbamate, sulfonyl, sulfonamide, or sulfuryl; and b) at least one of a carrier, diluent, surfactant, adjuvant, and/or other herbicidal compounds or other pesticides to inhibit growth of said weeds.

In a particular aspect, the method above where the said compounds can have the structure:

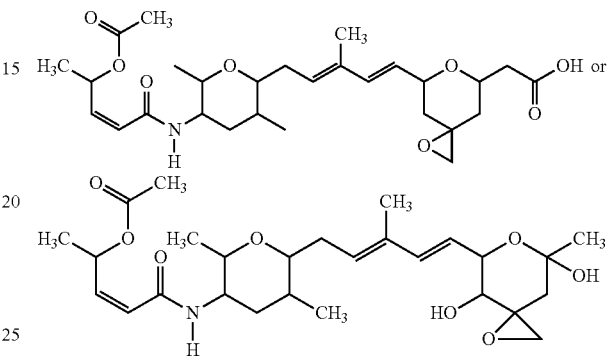

In another aspect, the method can include a first substance selected from the group consisting of one or more of the compounds set forth above; and b) optionally a second substance, wherein said second substance is a chemical or biological herbicide and/or pesticide and c) optionally at least one of a carrier, diluent, surfactant, or adjuvant.

Yet in another aspect, the weeds are controlled by inhibiting emergence and/or growth of monocotyledonous, sedge or dicotyledonous weeds comprising applying to said weed or soil an amount of (a) one or more of the compounds set forth above (b) optionally another substance, wherein said substance is a chemical or biological herbicide or (c) any combination set forth above in an amount effective to inhibit emergence or growth of monocotyledonous, sedge or dicotyledonous weeds.

In an aspect, said other herbicidal compounds include, but are not limited to: clove, cinnamon, lemongrass, citrus oils, orange peel oil, tentoxin, cornexistin, AAL-toxin, leptospermone, thaxtomin, sarmentine, momilactone B, sorgoleone, ascaulatoxin and ascaulatoxin aglycone. The chemical herbicide can include, but is not limited to, diflufenzopyr and salts thereof, dicamba and salts thereof, topramezone, tembotrione, S-metolachlor, atrazine, mesotrione, primisulfuron-methyl, 2,4-dichlorophenoxyacetic acid, nicosulfuron, thifensulfuron-methyl, asulam, metribuzin, diclofop-methyl, fluazifop, fenoxaprop-p-ethyl, asulam, oxyfluorfen, rimsulfuron, mecoprop, and quinclorac, thiobencarb, clomazone, cyhalofop, propanil, bensulfuron-methyl, penoxsulam, triclopyr, imazethapyr, halosulfuron-methyl, pendimethalin, bispyribac-sodium, carfentrazone ethyl, sodium bentazon/sodium acifluorfen, glyphosate, glufosinate, stearyl alcohol, and/or orthosulfamuron.

Yet in an aspect, the present disclosed herbicidal compounds exhibits synergistic effect with the aforementioned other herbicidal compound, as determined by COLBY's formula, where said formula has a ratio of greater than one.

In one aspect, the weeds include, but are not limited to: *Amaranthus hypochondriacus, Amaranthus retroflexus, Amaranthus palmeri, Amaranthus rudis, Chenopodium album, Kochia scoparia, Abutilon theophrasti, Malva syl-* vestris, *Stellaria media, Portulaca oleracea, Convolvulus arvensis, Ipomoea purpurea, Sinapsis arvensis, Raphanus raphanistrum, Medicago lupulina, Trifolium repens, Genista monspessulana, Epilobium angustifolium, Solanum nigrum, Setaria faberi, Bromus tectorum, Poa annua, Poa pratensis, Lolium multiflorum, Digitaria sanguinalis, Festuca arundinaceae, Echinochloa crus-galli, Plantago lanceolata, Helianthus annuus, Ambrosia artemisifolia, Bellis perennis, Taraxacum officinale, Lactuca serriola* and/or *Lactuca sativa.*

In a related aspect, provided herein is a seed coated with aforementioned composition(s). The seed can be a genetically modified seed that is herbicide resistant.

BRIEF DESCRIPTION OF THE DRAWINGS

For a more complete understanding of the features and advantages of the present invention, reference is now made to the detailed description of the invention along with the accompanying figures and in which:

FIG. 2: Fresh weight (g)/Plant evaluation on four leaves *A. palmer* plants 6DAT $p<0.000$ and $Rsq=0.6099$. Error bars represent the standard error. Grouping Information Using Fisher LSD Method and 90% Confidence. UTC=untreated control.

DETAILED DESCRIPTION OF THE INVENTION

Figure 1:
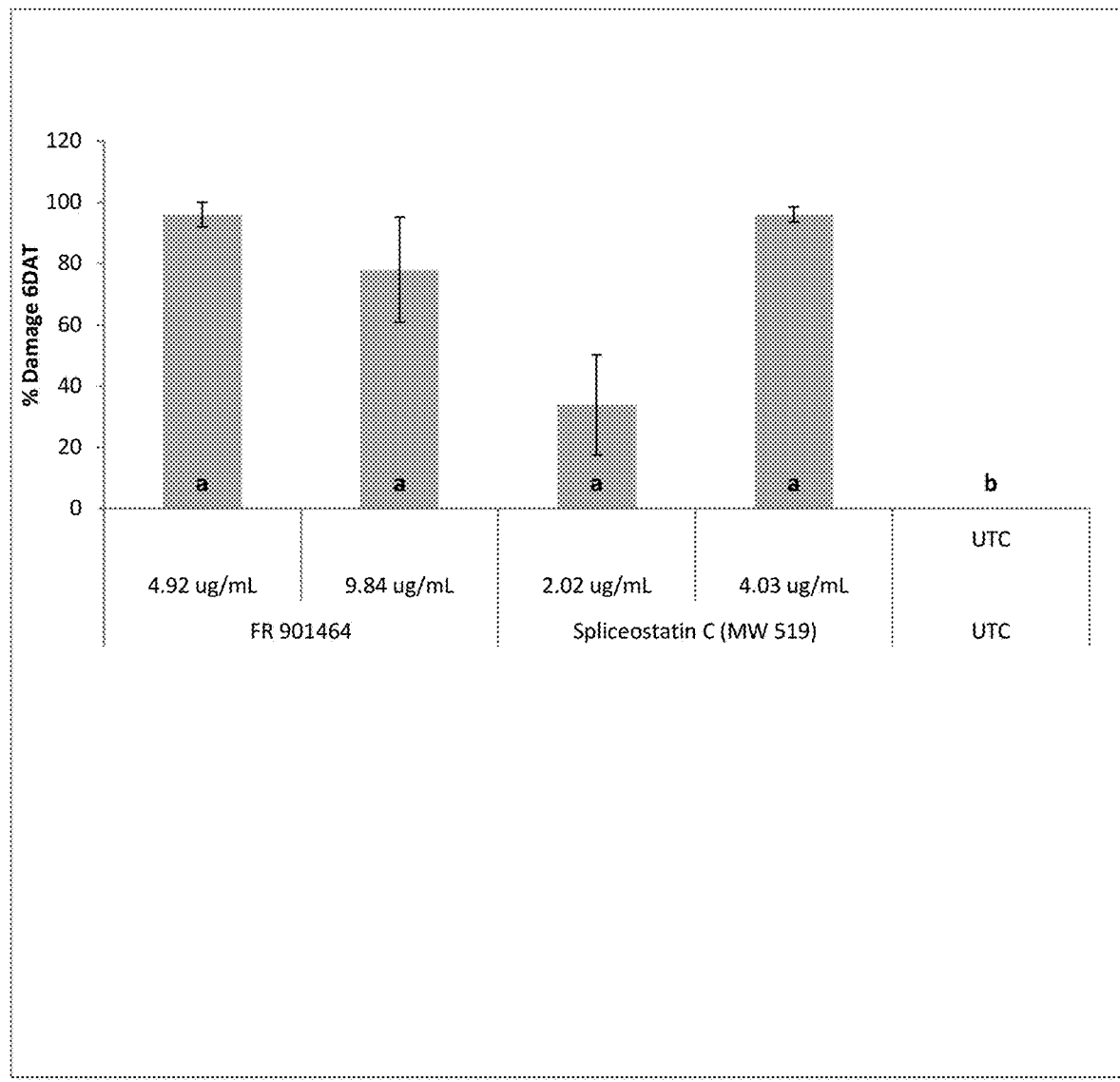
FIG. 1 denotes *Palmer amaranth* phytotoxicity test with Y-axis bring percentage of damage to *A. palmeri* plants treated at the 4 true leaf stage and evaluated 6 days after treatment (DAT) $p<0.000$ and $Rsq=0.7887$. Error bars represent the standard error. Grouping Information Using Fisher LSD Method and 90% Confidence. UTC=untreated control.

While the compositions and methods heretofore are susceptible to various modifications and alternative forms, exemplary embodiments will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

All publications and patent applications mentioned in the specification are indicative of the level of skill of those skilled in the art to which this invention pertains. All publications and patents, patent applications are herein incorporated by reference to the same extent as if each individual publication or patent application was specifically and individually indicated to be incorporated by reference.

Where a range of values is provided, it is understood that each intervening value, to the tenth of the unit of the lower limit, is included therein, unless the context clearly dictates otherwise.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

As used herein, the terms "comprises," "comprising," "includes," "including," "has," "having," "contains", "containing," "characterized by" or any other variation thereof, are intended to cover a non-exclusive inclusion, subject to any limitation explicitly indicated. For example, a composition, mixture, process or method that comprises a list of elements is not necessarily limited to only those elements but may include other elements not expressly listed or inherent to such composition, mixture, process, or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition, method that includes materials, steps, features, components, or elements, in addition to those literally disclosed, provided that these additional materials, steps, features, components, or elements do not materially affect the basic and novel characteristic(s) of the recited subject matter. The term "consisting essentially of" occupies a middle ground between "comprising" and "consisting of".

The term "herbicide" as used herein means a compound that controls or modifies the growth of plants. The term "herbicidally effective amount" means the quantity of such a compound or combination of such compounds that is capable of producing a controlling or modifying effect on the growth of plants. Controlling or modifying effects include all deviation from natural development, for example: killing, retardation, leaf burn, albinism, dwarfing and the like.

The term "plants" refers to all physical parts of a plant, including seeds, seedlings, saplings, roots, tubers, stems, stalks, foliage, and fruits. The term "locus" is intended to include soil, seeds, and seedlings, as well as established vegetation and includes not only areas where weeds may already be growing, but also areas where weeds have yet to emerge, and also to areas under cultivation with respect to crops of useful plants. "Areas under cultivation" include land on which the crop plants are already growing and land intended for cultivation with such crop plants. The term "weeds" as used herein means any undesired plant, and thus includes not only agronomically important weeds as described below, but also volunteer crop plants.

As referred to herein, the term "seedling", used either alone or in a combination of words means a young plant developing from the embryo of a seed.

As referred to herein, the term "broadleaf" used either alone or in words such as "broadleaf weed" means dicot or dicotyledon, a term used to describe a group of angiosperms characterized by embryos having two cotyledons.

By the term 'pre-emergence application' (pre-em) is meant application to the soil in which the weed seeds or seedlings are present before emergence of the weeds above the surface of the soil. By the term 'post-emergence application' (post-em) is meant application to the aerial or exposed portions of the weeds which have emerged above the surface of the soil. By the term 'early post-emergence application' (early post) is meant application to the aerial or exposed portions of the weeds which have emerged above the surface of the soil and are between the cotyledonous stage and the second to third leaf stage (or third and fourth whorl stage) of growth.

As defined herein, "whole broth culture" or "whole cell broth" refers to a liquid culture containing both cells and media. If bacteria are grown on a plate, the cells can be harvested in water or other liquid, whole culture. The terms "whole broth culture" and "whole cell broth" are used interchangeably.

As defined herein, "supernatant" refers to the liquid remaining when cells are grown in broth or are harvested in another liquid from an agar plate and are removed by centrifugation, filtration, sedimentation, or other means well known in the art.

As defined herein, "filtrate" refers to liquid from a whole broth culture that has passed through a membrane.

As defined herein, "extract" refers to liquid substance removed from cells by a solvent (water, detergent, buffer, organic solvent) and separated from the cells by centrifugation, filtration or other method.

As defined herein, "metabolite" refers to a compound, substance or byproduct of a fermentation of a microorganism, or supernatant, filtrate, or extract obtained from a microorganism that has herbicidal activity.

As defined herein, "derived from" means directly isolated or obtained from a particular source or alternatively having identifying characteristics of a substance or organism isolated or obtained from a particular source.

As defined herein, an "isolated or isolated compound" is essentially free of other compounds or substances, e.g., at least about 20% pure, preferably at least about 40% pure, more preferably about 60% pure, even more preferably about 80% pure, most preferably about 90% pure, and even most preferably about 95% pure, as determined by analytical methods, including but not limited to chromatographic methods, electrophoretic methods.

As used herein, the term "alkyl" refers to a monovalent straight or branched chain hydrocarbon group having from one to about 12 carbon atoms, including methyl, ethyl, n-propyl, isopropyl, n-butyl, isobutyl, tert-butyl, n-hexyl, and the like.

As used herein, "substituted alkyl" refers to alkyl groups further bearing one or more substituents selected from hydroxy, alkoxy, mercapto, cycloalkyl, substituted cycloalkyl, heterocyclic, substituted heterocyclic, aryl, substituted aryl, heteroaryl, substituted heteroaryl, aryloxy, substituted aryloxy, halogen, cyano, nitro, amino, amido, —C(O)H, acyl, oxyacyl, carboxyl, sulfonyl, sulfonamide, sulfuryl, and the like.

As used herein, "alkenyl" refers to straight or branched chain hydrocarbyl groups having one or more carbon-carbon double bonds, and having in the range of about 2 up to 12 carbon atoms, and "substituted alkenyl" refers to alkenyl groups further bearing one or more substituents as set forth above.

As used herein, "alkynyl" refers to straight or branched chain hydrocarbyl groups having at least one carbon-carbon triple bond, and having in the range of about 2 up to 12 carbon atoms, and "substituted alkynyl" refers to alkynyl groups further bearing one or more substituents as set forth above.

As used herein, "aryl" refers to aromatic groups having in the range of 6 up to 14 carbon atoms and "substituted aryl" refers to aryl groups further bearing one or more substituents as set forth above.

As used herein, "heteroaryl" refers to aromatic rings containing one or more heteroatoms (e.g., N, O, S, or the like) as part of the ring structure, and having in the range of 3 up to 14 carbon atoms and "substituted heteroaryl" refers to heteroaryl groups further bearing one or more substituents as set forth above.

As used herein, "alkoxy" refers to the moiety —O-alkyl-, wherein alkyl is as defined above, and "substituted alkoxy" refers to alkoxyl groups further bearing one or more substituents as set forth above.

As used herein, "thioalkyl" refers to the moiety —S-alkyl-, wherein alkyl is as defined above, and "substituted thioalkyl" refers to thioalkyl groups further bearing one or more substituents as set forth above.

As used herein, "cycloalkyl" refers to ring-containing alkyl groups containing in the range of about 3 up to 8 carbon atoms, and "substituted cycloalkyl" refers to cycloalkyl groups further bearing one or more substituents as set forth above.

As used herein, "heterocyclic", refers to cyclic (i.e., ring-containing) groups containing one or more heteroatoms (e.g., N, O, S, or the like) as part of the ring structure, and having in the range of 3 up to 14 carbon atoms and "substituted heterocyclic" refers to heterocyclic groups further bearing one or more substituent's as set forth above.

As used herein, "Herbicide safeners" are substances added to a herbicide formulation to eliminate or reduce phytotoxic effects of the herbicide to certain crops. These compounds protect crops from injury by herbicides but typically do not prevent the herbicide from controlling undesired vegetation. Examples of herbicide safeners include but are not limited to benoxacor, cloquintocet-mexyl, cumyluron, cyometrinil, cyprosulfamide, daimuron, dichlormid, dicyclonon, dietholate, dimepiperate, fenchlorazole-ethyl, fenclorim, flurazole, fluxofenim, furilazole, isoxadifen-ethyl, mefenpyr-diethyl, mephenate, methoxyphenone, naphthalic anhydride, oxabetrinil, N-(aminocarbonyl)-2-methylbenzenesulfonamide and N-(aminocarbonyl)-2-fluorobenzenesulfonamide, 1-bromo-4-[(chloromethyl) sulfonyl]benzene, 2-(dichloromethyl)-2-methyl-1,3-dioxolane (MG 191), 4-(dichloroacetyl)-1-oxa-4-azospiro-[4.5]decane (MON 4660), 2,2-dichloro-1-(2,2,5-trimethyl-3-oxazolidinyl)-ethanone and 2-methoxy-N-[[4-[[(methylamino)carbonyl]amino]phenyl]sulfonyl]-benzamide. Of note is dietholate, 2,2-dichloro-1-(2,2,5-trimethyl-3-oxazolidinyl)-ethanone and 2-methoxy-N-[[4-[[(methylamino)carbonyl]amino]phenyl]sulfonyl]-benzamide (alternatively named N-(2-methoxybenzoyl)-4-[(methylaminocarbonyl)amino] benzenesulfonamide; CAS #129531-12-0). Of particular note is 2-methoxy-N-[[4-[[(methylamino)carbonyl]amino]phenyl]sulfonyl]-benzamide (alternatively named N-(2-methoxybenzoyl)-4-[(methylaminocarbonyl)amino]benzenesulfonamide; CAS #129531-12-0).

*Burkholderia* A396 (NRRL B-50319) Strain. The *Burkholderia* A396 strain set forth herein is a non-*Burkholderia cepacia* complex, non-*Burkholderia plantari*, non-*Burkholderia gladioli, Burkholderia* sp and non-pathogenic to vertebrates, such as birds, mammals and fish. This strain can be isolated from a soil sample using procedures known in the art and described by Lorch et al., 1995. The isolation, characteristics, and method of obtaining metabolites of *Burkholderia* A396 are known in the art and can be found in, for example, U.S. Pat. No. 8,822,193 or 9,433,218, both of which are incorporated in reference in their entirety.

The composition of stearyl alcohol and its method of use in plant growth promotion are known in the art. See, for example, U.S. Pat. Nos. 6,489,2696 B1, 6,884,759 B2, 7,585,814 B2, and 7,718,571 B2, all of which are incorporated in reference in their entirety. More particularly, the various structures of stearyl alcohol, its methods of use are incorporated in reference. The hydrocarbon groups represented by R1, R2 and R3 may be respectively saturated or unsaturated groups, preferably saturated groups, and may be linear, branched or cyclic chains, preferably linear or branched chains, particularly preferably linear chains. The number of total carbons in the hydrocarbon group can be either an odd number or an even number, preferably an even number. The number of total carbons in R1, R2 or R3 is preferably 50 or less, more preferably 12 to 48, still more preferably 16 to 44. In the general formula (1), the number of carbons in R 1 is preferably 14 to 22, more preferably 14 to 20, still more preferably 14 to 18. The number of total carbons in the compound represented by the general formula (1) is preferably 12 to 48, more preferably 16 to 28, still more preferably 16 to 24. The compound is more preferably a compound containing 12 to 24 carbons in total and having one hydroxyl group, still more preferably a compound containing 16 to 22 carbons in total and having one hydroxyl group.

Herbicidal Compounds

In a particular embodiment, the present invention relates to herbicidal compounds that have the structure:

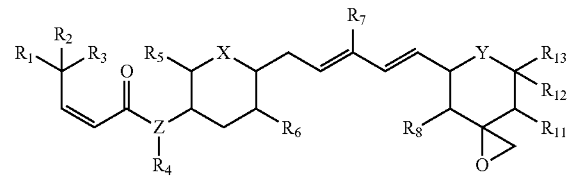

wherein X, Y and Z are each independently —O, —NR, or —S, wherein R is H or $C_1$-$C_{10}$alkyl; $R_1$, $R_2$, $R_3$, $R_4$, $R_5$, $R_6$, $R_7$, $R_8$, $R_{11}$, $R_{12}$, and $R_{13}$ are each independently H, alkyl, substituted alkyl, alkyl carboxylate acid, alkenyl, substituted alkenyl, alkynyl, substituted alkynyl, aryl, substituted aryl, heteroaryl, substituted heteroaryl, heterocyclic, substituted heterocyclic, cycloalkyl, substituted cycloalkyl, alkoxy, substituted alkoxy, thioalkyl, substituted thioalkyl, hydroxy, halogen, amino, amido, carboxyl, —C(O)H, acyl, oxyacyl, carbamate, sulfonyl, sulfonamide, or sulfuryl.

In a particular embodiment, the composition can have either of the following structures:

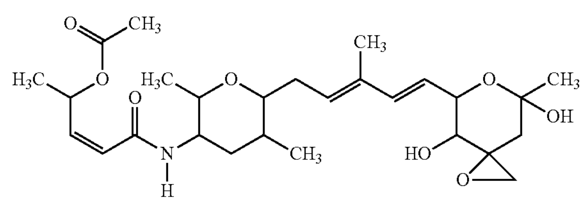

FR901464 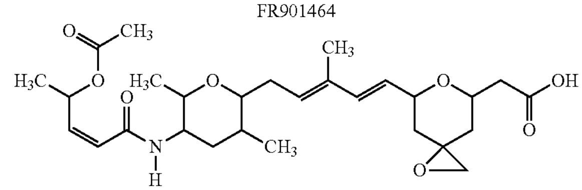 spliceostatin C

The compounds of the present disclosure can chemically synthesized or derived from other sources such as from a biological material.

The compounds of the present disclosure can be applied before or after planting of the crops, before weeds emerge (pre-emergence application) or after weeds emerge (post-emergence application), and are particularly effective when applied post-emergence to the weeds.

The aforementioned compounds according to the invention can be used as herbicides in unmodified form, as obtained in the synthesis, but they are generally formulated into herbicidal compositions in various ways using formulation adjuvants, such as carriers, solvents and surface-active substances. Therefore, the invention also relates to an herbicidal composition which comprises an herbicidally effective amount of a compound of formula (I) in addition to formulation adjuvants. The formulations can be in various physical forms, e.g. in the form of dusting powders, gels, wettable powders, water-dispersible granules, water-dispersible tablets, effervescent pellets, emulsifiable concentrates, microemulsifiable concentrates, oil-in-water emulsions, oil-flowables, aqueous dispersions, oily dispersions, suspo-emulsions, capsule suspensions, emulsifiable granules, soluble liquids, water-soluble concentrates (with water or a water-miscible organic solvent as carrier), impregnated polymer films or in other forms known e.g. from the Manual on Development and Use of FAO Specifications for Plant Protection Products, 5th Edition, 1999. Such formulations can either be used directly or they are diluted prior to use. The dilutions can be made, for example, with water, liquid fertilizers, micronutrients, biological organisms, oil or solvents.

The formulations can be prepared e.g. by mixing the active ingredient with the formulation adjuvants in order to obtain compositions in the form of finely divided solids, granules, solutions, dispersions or emulsions. The active ingredients can also be formulated with other adjuvants, such as finely divided solids, mineral oils, oils of vegetable or animal origin, modified oils of vegetable or animal origin, organic solvents, water, surface-active substances or combinations thereof. The active ingredients can also be contained in very fine microcapsules consisting of a polymer. Microcapsules contain the active ingredients in a porous carrier. This enables the active ingredients to be released into the environment in controlled amounts (e.g. slow-release). Microcapsules usually have a diameter of from 0.1 to 500 microns. They contain active ingredients in an amount of about from 25 to 95% by weight of the capsule weight. The active ingredients can be in the form of a monolithic solid, in the form of fine particles in solid or liquid dispersion or in the form of a suitable solution. The encapsulating membranes comprise, for example, natural or synthetic rubbers, cellulose, styrene/butadiene copolymers, polyacrylonitrile, polyacrylate, polyesters, polyamides, polyureas, polyurethane or chemically modified polymers and starch xanthates or other polymers that are known to the person skilled in the art in this connection. Alternatively, very fine microcapsules can be formed in which the active ingredient is contained in the form of finely divided particles in a solid matrix of base substance, but the microcapsules are not themselves encapsulated.

The formulation adjuvants that are suitable for the preparation of the compositions according to the invention are known per se. As liquid carriers there may be used: water, toluene, xylene, petroleum ether, vegetable oils, acetone, methyl ethyl ketone, cyclohexanone, acid anhydrides, acetonitrile, acetophenone, amyl acetate, 2-butanone, butylene carbonate, chlorobenzene, cyclohexane, cyclohexanol, alkyl esters of acetic acid, diacetone alcohol, 1,2-dichloropropane, diethanolamine, p-diethylbenzene, diethylene glycol, diethylene glycol abietate, diethylene glycol butyl ether, diethylene glycol ethyl ether, diethylene glycol methyl ether, N,N-dimethylformamide, dimethyl sulfoxide, 1,4-dioxane, dipropylene glycol, dipropylene glycol methyl ether, dipropylene glycol dibenzoate, diproxitol, alkylpyrrolidone, ethyl acetate, 2-ethylhexanol, ethylene carbonate, 1,1,1-trichloroethane, 2-heptanone, alpha-pinene, d-limonene, ethyl lactate, ethylene glycol, ethylene glycol butyl ether, ethylene glycol methyl ether, gamma-butyrolactone, glycerol, glycerol acetate, glycerol diacetate, glycerol triacetate, hexadecane, hexylene glycol, isoamyl acetate, isobornyl acetate, isooctane, isophorone, isopropylbenzene, isopropyl myristate, lactic acid, laurylamine, mesityl oxide, methoxypropanol, methyl isoamyl ketone, methyl isobutyl ketone, methyl laurate, methyl octanoate, methyl oleate, methylene chloride, m-xylene, n-hexane, n-octylamine, octadecanoic acid, octylamine acetate, oleic acid, oleylamine, o-xylene, phenol, polyethylene glycol (PEG400), propionic acid, propyl lactate, propylene carbonate, propylene glycol, propylene glycol methyl ether, p-xylene, toluene, triethyl phosphate, triethylene glycol, xylenesulfonic acid, paraffin, mineral oil, trichloroethylene, perchloroethylene, ethyl acetate, amyl acetate, butyl acetate, propylene glycol methyl ether, diethylene glycol methyl ether, methanol, ethanol, isopropanol, and alcohols of higher molecular weight, such as amyl alcohol, tetrahydro-furfuryl alcohol, hexanol, octanol, ethylene glycol, propylene glycol, glycerol, N-methyl-2-pyrrolidone and the like. Water is generally the carrier of choice for diluting the concentrates. Suitable solid carriers are, for example, talc, titanium dioxide, pyrophyllite clay, silica, attapulgite clay, kieselguhr, limestone, calcium carbonate, bentonite, calcium montmorillonite, cottonseed husks, wheat flour, soybean flour, pumice, wood flour, ground walnut shells, lignin and similar substances, as described, for example, in CFR 180.1001. (c) & (d).

A large number of surface-active substances can advantageously be used in both solid and liquid formulations, especially in those formulations which can be diluted with a carrier prior to use. Surface-active substances may be anionic, cationic, non-ionic or polymeric and they can be used as emulsifiers, wetting agents or suspending agents or for other purposes. Typical surface-active substances include, for example, salts of alkyl sulfates, such as diethanolammonium lauryl sulfate; salts of alkylarylsulfonates, such as calcium dodecyl-benzenesulfonate; alkylphenol/alkylene oxide addition products, such as nonylphenol ethoxylate; alcohol/alkylene oxide addition products, such as tri-decylalcohol ethoxylate; soaps, such as sodium stearate; salts of alkylnaphthalenesulfonates, such as sodium dibutylnaphthalenesulfonate; dialkyl esters of sulfosuccinate salts, such as sodium di(2-ethylhexyl)sulfosuccinate; sorbitol esters, such as sorbitol oleate; quaternary amines, such as lauryltrimethylammonium chloride, polyethylene glycol esters of fatty acids, such as polyethylene glycol stearate; block copolymers of ethylene oxide and propylene oxide; and salts of mono- and di-alkylphosphate esters; and also further substances described e.g. in "McCutcheon's Detergents and Emulsifiers Annual" MC Publishing Corp., Ridgewood N.J., 1981.

Further adjuvants that can usually be used in pesticidal formulations include crystallization inhibitors, viscosity modifiers, suspending agents, dyes, anti-oxidants, foaming agents, light absorbers, mixing auxiliaries, antifoams, complexing agents, neutralizing or pH-modifying substances and buffers, corrosion inhibitors, fragrances, wetting agents, take-up enhancers, micronutrients, plasticisers, glidants, lubricants, dispersants, thickeners, antifreezes, microbicides, and also liquid and solid fertilizers.

The compositions according to the invention can additionally include an additive comprising an oil of vegetable or animal origin, a mineral oil, alkyl esters of such oils or mixtures of such oils and oil derivatives. The amount of oil additive in the composition according to the invention is generally from 0.01 to 10%, based on the spray mixture. For example, the oil additive can be added to the spray tank in the desired concentration after the spray mixture has been prepared. Preferred oil additives comprise mineral oils or an oil of vegetable origin, for example rapeseed oil, olive oil or sunflower oil, emulsified vegetable oil, such as AMIGO® (Rhône-Poulenc Canada Inc.), alkyl esters of oils of vegetable origin, for example the methyl derivatives, or an oil of animal origin, such as fish oil or beef tallow. A preferred additive contains, for example, as active components essentially 80% by weight alkyl esters of fish oils and 15% by weight methylated rapeseed oil, and also 5% by weight of customary emulsifiers and pH modifiers. Especially preferred oil additives comprise alkyl esters of C8-C22 fatty acids, especially the methyl derivatives of C12-C18 fatty acids, for example the methyl esters of lauric acid, palmitic acid and oleic acid, being of importance. Those esters are known as methyl laurate (CAS-111-82-0), methyl palmitate (CAS-112-39-0) and methyl oleate (CAS-112-62-9). A preferred fatty acid methyl ester derivative is Emery® 2230 and 2231 (Cognis GmbH). Those and other oil derivatives are also known from the Compendium of Herbicide Adjuvants, 5th Edition, Southern Illinois University, 2000.

The application and action of the oil additives can be further improved by combination with surface-active substances, such as non-ionic, anionic or cationic surfactants. Examples of suitable anionic, non-ionic and cationic surfactants are listed on pages 7 and 8 of WO 97/34485. Preferred surface-active substances are anionic surfactants of the dodecylbenzylsulfonate type, especially the calcium salts thereof, and also non-ionic surfactants of the fatty alcohol ethoxylate type. Special preference is given to ethoxylated C12-C22 fatty alcohols having a degree of ethoxylation of from 5 to 40. Examples of commercially available surfactants are the Genapol types (Clariant AG). Also preferred are silicone surfactants, especially polyalkyl-oxide-modified heptamethyltriloxanes which are commercially available e.g. as Silwet L-77®, and also perfluorinated surfactants. The concentration of the surface-active substances in relation to the total additive is generally from 1 to 30% by weight. Examples of oil additives consisting of mixtures of oil or mineral oils or derivatives thereof with surfactants are Edenor ME SU®, Turbocharge® (Syngenta AG, CH) or ActipronC (BP Oil UK Limited, GB).

If desired, it is also possible for the mentioned surface-active substances to be used in the formulations on their own, that is to say, without oil additives.

Furthermore, the addition of an organic solvent to the oil additive/surfactant mixture may contribute to an additional enhancement of action. Suitable solvents are, for example, Solvesso® (ESSO) or Aromatic Solvent® (Exxon Corporation). The concentration of such solvents can be from 10 to 80% by weight of the total weight. Oil additives that are present in admixture with solvents are described, for example, in U.S. Pat. No. 4,834,908. A commercially available oil additive disclosed therein is known by the name MERGE® (BASF Corporation). A further oil additive that is preferred according to the invention is SCORE® (Syngenta Crop Protection Canada).

In addition to the oil additives listed above, for the purpose of enhancing the action of the compositions according to the invention it is also possible for formulations of alkylpyrrolidones (e.g. Agrimax®) to be added to the spray mixture. Formulations of synthetic lattices, e.g. polyacrylamide, polyvinyl compounds or poly-1-p-menthene (e.g. Bond®, Courier® or Emerald®) may also be used. It is also possible for solutions that contain propionic acid, for example Eurogkem Pen-e-trate®, to be added to the spray mixture as action-enhancing agent.

The herbicidal compositions generally comprise from 0.1 to 99% by weight, especially from 0.1 to 95% by weight, compounds of formula (I) and from 1 to 99.9% by weight of a formulation adjuvant which preferably includes from 0 to 25% by weight of a surface-active substance. Whereas commercial products will preferably be formulated as concentrates, the end user will normally employ dilute formulations.

In an even another particular embodiment, any of the above compounds can be from either natural materials or compounds obtained or isolated from commercial sources or by chemical synthesis, for example, see U.S. patent application number U.S. 2008/0096879 A1, the content is hereby incorporated in reference in its entirety. Natural sources include, but are not limited to, microorganisms, alga, and sponges. In a more particular embodiment, microorganisms which include species such as *Burkholderia* sp. More specific embodiment include *Burkholderia* sp. A396 (NRRL B-50319).

Compounds of this disclosure can exist as one or more stereoisomers. The various stereoisomers include enantiomers, diastereomers, atropisomers and geometric isomers. Stereoisomers are isomers of identical constitution but differing in the arrangement of their atoms in space and include enantiomers, diastereomers, cis-trans isomers (also known as geometric isomers) and atropisomers. Atropisomers result from restricted rotation about single bonds where the rotational barrier is high enough to permit isolation of the isomeric species. One skilled in the art will appreciate that one stereoisomer may be more active and/or may exhibit beneficial effects when enriched relative to the other stereoisomer(s) or when separated from the other stereoisomer(s). Additionally, the skilled artisan knows how to separate, enrich, and/or to selectively prepare said stereoisomers. Compounds of this disclosure may be present as a mixture of stereoisomers, individual stereoisomers or as an optically active form.

The above compound(s) can be used as an herbicide. The method of the treatment of the plants and plant parts with the compositions set forth above can be carried out directly or by allowing the said compositions to act on their surroundings, habitat or storage space by, for example, immersion, drenching, chemigation, spraying, evaporation, fogging, scattering, painting on, injecting.

The compositions can be applied using methods known in the art. Specifically, these compositions can be applied to plants or plant parts. Plants are to be understood as meaning in the present context all plants and plant populations such as desired and undesired wild plants or crop plants (including naturally occurring crop plants). Crop plants can be plants which can be obtained by conventional plant breeding and optimization methods or by biotechnological and genetic engineering methods or by combinations of these methods, including the transgenic plants and including the plant cultivars protectable or not protectable by plant breeders' rights. Plant parts are to be understood as meaning all parts and organs of plants above and below the ground, such as shoot, leaf, flower and root, examples which may be mentioned being leaves, needles, stalks, stems, flowers, fruit bodies, fruits, seeds, roots, tubers and rhizomes. The plant parts also include harvested material, and vegetative and generative propagation material, for example cuttings, tubers, rhizomes, offshoots and seeds.

Compounds of this disclosure are generally useful as an herbicidal active ingredient in a composition, i.e. formulation, with at least one additional component selected from the group consisting of surfactants, solid diluents and liquid diluents, which serves as a carrier. The formulation or composition ingredients are selected to be consistent with the physical properties of the active ingredient, mode of application and environmental factors such as soil type, moisture and temperature.

Useful formulations include both liquid and solid compositions. Liquid compositions include solutions (including emulsifiable concentrates), suspensions, emulsions (including microemulsions, oil-in-water emulsions, flowable concentrates and/or suspoemulsions) and the like, which optionally can be thickened into gels. The general types of aqueous liquid compositions are soluble concentrate, suspension concentrate, capsule suspension, concentrated emulsion, microemulsion, oil-in-water emulsion, flowable concentrate and suspo-emulsion. The general types of nonaqueous liquid compositions are emulsifiable concentrate, microemulsifiable concentrate, dispersible concentrate and oil dispersion.

The general types of solid compositions are dusts, powders, granules, pellets, prills, pastilles, tablets, filled films (including seed coatings) and the like, which can be water-dispersible ("wettable") or water-soluble. Films and coatings formed from film-forming solutions or flowable suspensions are particularly useful for seed treatment. Active ingredient can be (micro)encapsulated and further formed into a suspension or solid formulation; alternatively the entire formulation of active ingredient can be encapsulated (or "overcoated"). Encapsulation can control or delay release of the active ingredient. An emulsifiable granule combines the advantages of both an emulsifiable concentrate formulation and a dry granular formulation. High-strength compositions are primarily used as intermediates for further formulation.

Sprayable formulations are typically extended in a suitable medium before spraying. Such liquid and solid formulations are formulated to be readily diluted in the spray medium, usually water, but occasionally another suitable medium like an aromatic or paraffinic hydrocarbon or vegetable oil. Spray volumes can range from about from about one to several thousand liters per hectare, but more typically are in the range from about ten to several hundred liters per hectare. Sprayable formulations can be tank mixed with water or another suitable medium for foliar treatment by aerial or ground application, or for application to the growing medium of the plant. Liquid and dry formulations can be metered directly into drip irrigation systems or metered into the furrow during planting.

The formulations will typically contain effective amounts of active ingredient, diluent and surfactant within the following approximate ranges which add up to 100 percent by weight.

The substances set forth above used in the compositions and methods disclosed herein can be formulated in any manner. Non-limiting formulation examples include but are not limited to Emulsifiable concentrates (EC), Wettable powders (WP), soluble liquids (SL), Aerosols, Ultra-low volume concentrate solutions (ULV), Soluble powders (SP), Microencapsulation, Water dispersed Granules, Flowables (FL), Microemulsions (ME), Nano-emulsions (NE), and Seed treatments etc. In any formulation described herein, percent of the active ingredient is within a range of 0.01% to 99.99% and include any and all incremental variations thereof.

The composition can additionally comprise a surfactant to be used for the purpose of emulsification, uptake, sticking, dispersion, wetting, spreading, integration, disintegration control, stabilization of active ingredients, and improvement of fluidity or rust inhibition. In a particular embodiment, the surfactant is a non-phytotoxic non-ionic surfactant which belongs to EPA Inerts List 4B. In another particular embodiment, the nonionic surfactant is polyoxyethylene (20) monolaurate. The concentration of surfactants can range between 0.1-35% of the total formulation, or range is 5-25%. The choice of dispersing and emulsifying agents, such as non-ionic, anionic, amphoteric and cationic dispersing and emulsifying agents, and the amount employed is determined by the nature of the composition and the ability of the agent to facilitate the dispersion of the compositions.

Solid diluents include, for example, clays such as bentonite, montmorillonite, attapulgite and kaolin, gypsum, cellulose, titanium dioxide, zinc oxide, starch, dextrin, sugars (e.g., lactose, sucrose), silica, talc, mica, diatomaceous earth, urea, calcium carbonate, sodium carbonate and bicarbonate, and sodium sulfate. Typical solid diluents are described in Watkins et al., Handbook of Insecticide Dust Diluents and Carriers, 2nd Ed., Dorland Books, Caldwell, N.J.

Liquid diluents include, for example, water, N,N-dimethylalkanamides (e.g., N,N-dimethylformamide), limonene, dimethyl sulfoxide, N-alkylpyrrolidones (e.g., N-methylpyrrolidinone), alkyl phosphates (e.g., triethyl phosphate), ethylene glycol, triethylene glycol, propylene glycol, dipropylene glycol, polypropylene glycol, propylene carbonate, butylene carbonate, paraffins (e.g., white mineral oils, normal paraffins, isoparaffins), alkylbenzenes, alkylnaphthalenes, glycerine, glycerol triacetate, sorbitol, aromatic hydrocarbons, dearomatized aliphatics, alkylbenzenes, alkylnaphthalenes, ketones such as cyclohexanone, 2-heptanone, isophorone and 4-hydroxy-4-methyl-2-pentanone, acetates such as isoamyl acetate, hexyl acetate, heptyl acetate, octyl acetate, nonyl acetate, tridecyl acetate and isobornyl acetate, other esters such as alkylated lactate esters, dibasic esters, alkyl and aryl benzoates and Û-butyrolactone, and alcohols, which can be linear, branched, saturated or unsaturated, such as methanol, ethanol, n-propanol, isopropyl alcohol, n-butanol, isobutyl alcohol, n-hexanol, 2-ethylhexanol, n-octanol, decanol, isodecyl alcohol, isooctadecanol, cetyl alcohol, lauryl alcohol, tridecyl alcohol, oleyl alcohol, cyclohexanol, tetrahydrofurfuryl alcohol, diacetone alcohol, cresol and benzyl alcohol. Liquid diluents also include glycerol esters of saturated and unsaturated fatty acids (typically C6-C22), such as plant seed and fruit oils (e.g., oils of olive, castor, linseed, sesame, corn (maize), peanut, sunflower, grapeseed, safflower, cottonseed, soybean, rapeseed, coconut and palm kernel), animal-sourced fats (e.g., beef tallow, pork tallow, lard, cod liver oil, fish oil), and mixtures thereof. Liquid diluents also include alkylated fatty acids (e.g., methylated, ethylated, butylated) wherein the fatty acids may be obtained by hydrolysis of glycerol esters from plant and animal sources, and can be purified by distillation. Typical liquid diluents are described in Marsden, Solvents Guide, 2nd Ed., Interscience, New York, 1950.

The solid and liquid compositions of the present disclosure often include one or more surfactants. When added to a liquid, surfactants (also known as "surface-active agents") generally modify, most often reduce, the surface tension of the liquid. Depending on the nature of the hydrophilic and lipophilic groups in a surfactant molecule, surfactants can be useful as wetting agents, dispersants, emulsifiers or defoaming agents.

Surfactants can be classified as nonionic, anionic or cationic. Nonionic surfactants useful for the present compositions include, but are not limited to: alcohol alkoxylates such as alcohol alkoxylates based on natural and synthetic alcohols (which may be branched or linear) and prepared from the alcohols and ethylene oxide, propylene oxide, butylene oxide or mixtures thereof; amine ethoxylates, alkanolamides and ethoxylated alkanolamides; alkoxylated triglycerides such as ethoxylated soybean, castor and rapeseed oils; alkylphenol alkoxylates such as octylphenol ethoxylates, nonylphenol ethoxylates, dinonyl phenol ethoxylates and dodecyl phenol ethoxylates (prepared from the phenols and ethylene oxide, propylene oxide, butylene oxide or mixtures thereof); block polymers prepared from ethylene oxide or propylene oxide and reverse block polymers where the terminal blocks are prepared from propylene oxide; ethoxylated fatty acids; ethoxylated fatty esters and oils; ethoxylated methyl esters; ethoxylated tristyrylphenol (including those prepared from ethylene oxide, propylene oxide, butylene oxide or mixtures thereof); fatty acid esters, glycerol esters, lanolin-based derivatives, polyethoxylate esters such as polyethoxylated sorbitan fatty acid esters, polyethoxylated sorbitol fatty acid esters and polyethoxylated glycerol fatty acid esters; other sorbitan derivatives such as sorbitan esters; polymeric surfactants such as random copolymers, block copolymers, alkyd peg (polyethylene glycol) resins, graft or comb polymers and star polymers; polyethylene glycols (pegs); polyethylene glycol fatty acid esters; silicone-based surfactants; and sugar-derivatives such as sucrose esters, alkyl polyglycosides and alkyl polysaccharides.

Anionic surfactants include, but are not limited to: alkylaryl sulfonic acids and their salts; carboxylated alcohol or alkylphenol ethoxylates; diphenyl sulfonate derivatives; lignin and lignin derivatives such as lignosulfonates; maleic or succinic acids or their anhydrides; olefin sulfonates; phosphate esters such as phosphate esters of alcohol alkoxylates, phosphate esters of alkylphenol alkoxylates and phosphate esters of styryl phenol ethoxylates; protein-based surfactants; sarcosine derivatives; styryl phenol ether sulfate; sulfates and sulfonates of oils and fatty acids; sulfates and sulfonates of ethoxylated alkylphenols; sulfates of alcohols; sulfates of ethoxylated alcohols; sulfonates of amines and amides such as N,N-alkyltaurates; sulfonates of benzene, cumene, toluene, xylene, and dodecyl and tridecylbenzenes; sulfonates of condensed naphthalenes; sulfonates of naphthalene and alkyl naphthalene; sulfonates of fractionated petroleum; sulfosuccinamates; and sulfosuccinates and their derivatives such as dialkyl sulfosuccinate salts.

Cationic surfactants include, but are not limited to: amides and ethoxylated amides; amines such as N-alkyl propanediamines, tripropylenetriamines and dipropylenetetramines, and ethoxylated amines, ethoxylated diamines and propoxylated amines (prepared from the amines and ethylene oxide, propylene oxide, butylene oxide or mixtures thereof); amine salts such as amine acetates and diamine salts; quaternary ammonium salts such as quaternary salts, ethoxylated quaternary salts and diquaternary salts; and amine oxides such as alkyldimethylamine oxides and bis-(2-hydroxyethyl)-alkylamine oxides.

Also, for the present compositions are mixtures of nonionic and anionic surfactants or mixtures of nonionic and cationic surfactants. Nonionic, anionic and cationic surfactants and their recommended uses are disclosed in a variety of published references including McCutcheon's Emulsifiers and Detergents, annual American and International Editions published by McCutcheon's Division, The Manufacturing Confectioner Publishing Co.; Sisely and Wood, Encyclopedia of Surface Active Agents, Chemical Publ. Co., Inc., New York, 1964; and A. S. Davidson and B. Milwidsky, Synthetic Detergents, Seventh Edition, John Wiley and Sons, New York, 1987.

Compositions of this disclosure can also contain formulation auxiliaries and additives, known to those skilled in the art as formulation aids (some of which may be considered to also function as solid diluents, liquid diluents or surfactants). Such formulation auxiliaries and additives may control: pH (buffers), foaming during processing (antifoams such polyorganosiloxanes), sedimentation of active ingredients (suspending agents), viscosity (thixotropic thickeners), in-container microbial growth (antimicrobials), product freezing (antifreezes), color (dyes/pigment dispersions), wash-off (film formers or stickers), evaporation (evaporation retardants), and other formulation attributes. Film formers include, for example, polyvinyl acetates, polyvinyl acetate copolymers, polyvinylpyrrolidone-vinyl acetate copolymer, polyvinyl alcohols, polyvinyl alcohol copolymers and waxes. Examples of formulation auxiliaries and additives include those listed in McCutcheon's Volume 2: Functional Materials, annual International and North American editions published by McCutcheon's Division, The Manufacturing Confectioner Publishing Co.; and PCT Publication WO 03/024222.

The composition as set forth above also comprises a stabilizing agent, which stabilizes a biological pesticide composition against physical separation and loss of activity due to exposure to sunlight. This stabilizing agent can be a benzoic acid salt or lignin sulfonate salt.

Herbicidal compositions disclosed herein can be applied in liquid or solid form as pre-emergence or post-emergence formulations.

For pre-emergence dry formulations, the granule size of the carrier is typically 1-2 mm (diameter) but the granules can be either smaller or larger depending on the required ground coverage. Granules can contain porous or non-porous particles.

For post-emergence formulations, the formulation components used can contain smectite clays, attapulgite clays and similar swelling clays, thickeners such as xanthan gums, gum Arabic and other polysaccharide thickeners as well as dispersion stabilizers such as nonionic surfactants (for example polyoxyethylene (20) monolaurate).

Furthermore, the compositions can be used in combination with seed-coating agents. Such seed coating agents can include, but are not limited to, ethylene glycol, carboxymethyl cellulose, methyl cellulose, polyethylene glycol, chitosan, carboxymethyl chitosan, peat moss, resins and waxes. The compositions can be applied using methods known in the art. Specifically, these compositions can be applied to and around plants or plant parts. Plants are to be understood as meaning in the present context all plants and plant populations such as desired and undesired wild plants or crop plants (including naturally occurring crop plants). Crop plants can be plants which can be obtained by conventional plant breeding and optimization methods or by biotechnological and genetic engineering methods or by combinations of these methods, including the transgenic plants and including the plant cultivars protectable or not protectable by plant breeders' rights. Plants include all parts and organs of plants above and below the ground, such as shoot, leaf, flower and root, examples which may be mentioned being leaves, needles, stalks, stems, flowers, fruit bodies, fruits, seeds, roots, tubers and rhizomes. The plants include, but are not limited to, harvested material, and vegetative and generative propagation material, for example cuttings, tubers, rhizomes, offshoots and seeds.

A herbicidally effective amount of the compounds of this disclosure is determined by a number of factors. These factors include: formulation selected, method of application, amount and type of vegetation present, growing conditions, etc. In general, a herbicidally effective amount of compounds of this disclosure is from about 0.005 to about 20 kg/ha. In some embodiments, the range is from about 0.01 to about 1 kg/ha. One skilled in the art can easily determine the herbicidally effective amount necessary for the desired level of weed control.

Genetically modified plant cultivars which can be treated according to this disclosure include those that are resistant against one or more biotic stresses (pests such as nematodes, insects, mites, fungi, etc.) or abiotic stresses (drought, cold temperature, soil salinity, etc.), or that contain other desirable characteristics. Plants can be genetically modified to exhibit traits of, for example, herbicide tolerance, insectresistance, modified oil profiles or drought tolerance. Useful genetically modified plants containing single gene transformation events or combinations of transformation events. Additional information for the genetic modifications can be obtained from publicly available databases maintained, for example, by the U.S. Department of Agriculture.

Treatment of genetically modified plants with compounds of this disclosure may result in super-additive or synergistic effects. For example, reduction in application rates, broadening of the activity spectrum, increased tolerance to biotic/abiotic stresses or enhanced storage stability may be greater than expected from just simple additive effects of the application of compounds of this disclosure on genetically modified plants.

Compounds of this disclosure can also be mixed with one or more other biologically active compounds or agents including herbicides, herbicide safeners, fungicides, insecticides, nematocides, bactericides, acaricides, growth regulators such as insect molting inhibitors and rooting stimulants, chemosterilants, semiochemicals, repellents, attractants, pheromones, feeding stimulants, plant nutrients, other biologically active compounds or entomopathogenic bacteria, virus or fungi to form a multi-component pesticide giving an even broader spectrum of agricultural protection. Mixtures of compounds of this disclosure with other herbicides can broaden the spectrum of activity against additional weed species, and suppress the proliferation of any resistant biotypes.

The composition can further comprise one or more additional herbicide. These include, but are not limited to, a bioherbicide and/or a chemical herbicide. The bioherbicide can be selected from the group consisting of clove, cinnamon, lemongrass, citrus oils, orange peel oil, tentoxin, cornexistin, AAL-toxin, leptospermone, thaxtomin, sarmentine, momilactone B, sorgoleone, pelargonic acid, caprylic acid, capric acid, ascaulatoxin and ascaulatoxin aglycone. The chemical herbicides can include, but are not limited to triazines, triazinones, ureas, amides, diphenyl ethers, triazolinones, bipyridyliums, clomazone, 4-HPPD inhibitors, PDS inhibitors, imidazolinones, sulfonylureas, pyrimidinyl (thio) benzoates, triazolopyrimidines, glycines, phosphinic acids, dinitrophenols, cyclohexanediones, aryloxyphenoxypropionates, asulam, thiocarbamates, dinitroanilines, carbamates, chloroacetamides, alkylazines, isoxaben, pyridinecarboxylic acids, benzoic acids, quinolinecarboxylic acids, phenoxycarboxylic acids and MSMA. The composition can further comprise one or more pesticides.

To widen the spectrum of action and to achieve synergistic effects, the compounds of the formula I can be mixed with a large number of representatives of other herbicidal or growth-regulating active ingredient groups and then applied concomitantly. Suitable components for mixtures are, for example, 1,2,4-thiadiazoles, 1,3,4-thiadiazoles, amides, aminophosphoric acid and its derivatives, aminotriazoles, anilides, (het)aryloxyalkanoic acids and their derivatives, benzoic acid and its derivatives, benzothiadiazinones, 2-aroyl-1,3-cyclohexanediones, 2-hetaroyl-1,3-cyclohexane-diones, hetaryl aryl ketones, benzylisoxazolidinones, meta-CF3-phenyl derivatives, carbamates, quinolinecarboxylic acid and its derivatives, chloroacetanilides, cyclohexenone oxime ether derivatives, diazines, dichloropropionic acid and its derivatives, dihydrobenzofurans, dihydrofuran-3-ones, dinitroanilines, dinitrophenols, diphenyl ethers, dipyridyls, halocarboxylic acids and their derivatives, ureas, 3-phenyluracils, imidazoles, imidazolinones, N-phenyl-3,4,5,6-tetrahydrophthalimides, oxadiazoles, oxiranes, phenols, aryloxy- and hetaryloxyphenoxypropionic esters, phenylacetic acid and its derivatives, 2-phenylpropionic acid and its derivatives, pyrazoles, phenylpyrazoles, pyridazines, pyridinecarboxylic acid and its derivatives, pyrimidyl ethers, sulfonamides, sulfonylureas, triazines, triazinones, triazolinones, triazolecarboxamides, uracils, phenyl pyrazolines and isoxazolines and derivatives thereof.

In a particular embodiment, the compositions and herbicidal compounds are derived from the *Burkholderia* A396 (NRRL B-50319) strain.

The substances and compositions can also be used to modulate emergence in either a pre-emergent or post-emergent formulation of monocotyledonous, sedge or dicotyledonous weeds. In a particular embodiment, the weeds can be *Amaranthus palmeri, Amaranthus rudis, Chenopodium album, Abutilon theophrasti, Helianthus annuus, Ambrosia artemesifolia, Amaranthus retroflexus, Convolvulus arvensis, Brassica kaber, Taraxacum officinale, Solanum nigrum, Malva neglect, Setaria lutescens, Bromus tectorum, Poa annua, Poapratensis, Palmer amaranth, Lolium perenne* L. var. Pace, *Festuca arundinaceae* Schreb. var. Aztec II, Anthem II, LS1100, *Echinochloa crus-galli*, and/or *Lactuca sativa.*

Herbicidal Synergy

In one embodiment, the herbicidal composition of FR901464 and/or spliceostatin C can exhibit herbicidal synergy when applied with stearyl alcohol via rotation and/or tank mix.

Stearyl alcohol can include the following formula:

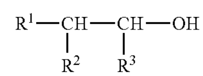

wherein R1 represents a C10 to C22 hydrocarbon group, R2 represents a hydrogen atom, a hydroxyl group or a C1 to C24 hydrocarbon group, and R3 represents a hydrogen atom or a C1 to C24 hydrocarbon group.

Herbicidal synergy can be measure by known method in the art. For example, using the Colby's formula, wherein when the ratio is greater than 1, it indicates synergy.

It is surprising and unexpected to have synergy between stearyl alcohol and FR901464/spliceostatin C, because stearyl alcohol is known to promote growth of a plant, yet when combined with FR901464/spliceostatin C, the combination exhibits enhanced herbicidal activity.

EXAMPLES

The composition and methods set forth above will be further illustrated in the following, non-limiting Examples. The examples are illustrative of various embodiments only and do not limit the claimed invention regarding the materials, conditions, weight ratios, process parameters and the like recited herein.

Example 1: Isolation of Active Fractions and Substances from Heat Inactivated *Burkholderia* A396 (NRRL B-50319)

As noted above, the herbicidal compositions can be chemically synthesized or derived from a biological organism. Here, the culture broth derived from the 100 L fermentation *Burkholderia* (A396) was extracted to give crude extract. The crude extract was then fractionated using reversed-phase C18 vacuum liquid chromatography ($H_2O$/$CH_3OH$) to give 5 fractions. These fractions were then screened for herbicidal activity using plant assay with *Amaranthus hypochondriacus* (Burgundy amaranth). The active fractions (F3 & F4) were then subjected to reversed phase HPLC to give pure compounds, which were then tested in the above mentioned bioassay to locate/identify the active compounds. The isolated compounds were tested at 1.3 and 0.65 µg/mL and the results showed inhibitory control with two compounds. To confirm the identity of the compounds, additional spectroscopic data such as LC-MS and NMR were recorded. Based on the detailed analysis of the data, the two compounds were identified as FR 901464 (MW 507) and spliceostatin C (MW 519). Note that different fermentation method would produce different (or no) amount of the below compound(s), some none at all.

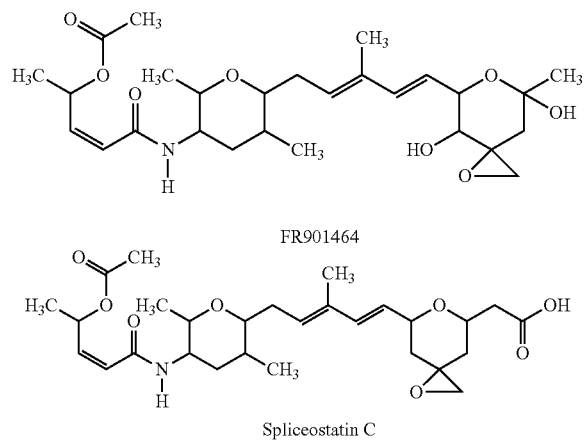

FR901464

Spliceostatin C

Example 2: Herbicidal Bioassay for FR901464 and Spliceostatin C Against Burgundy Amaranth Burgundy amaranth (*Amaranthus hypochondriacus*) plants were grown in a greenhouse to the 3-4 leaf stage in 2.5 cm square pots containing plant growth mix with slow release fertilizer. Treatments were then applied using a research cabinet track sprayer fitted with an 8001 nozzle and at a carrier volume of 20 gal/A. Negative controls were sprayed with water. Pots were blocked and randomized by treatment after spray and placed in a growth room at 25° C. and 50% RH, and watered as necessary. Plants were evaluated 6 days after application for visual damage and fresh weight. Data in Table 1 was subjected to ANOVA and means were separated using the Tukey method with 95% confidence intervals.

TABLE 1

| | (%) Mortality/Control at Concentration (µg/mL) | |
|---|---|---|
| Compounds | 0.65 | 1.3 |
| FR901464 | 44 | 84 |
| Spliceostatin C | 44 | 80 |

Example 3: Herbicidal Bioassays for FR901464 and Spliceostatin C Against *Palmer amaranth*

Figure 2:
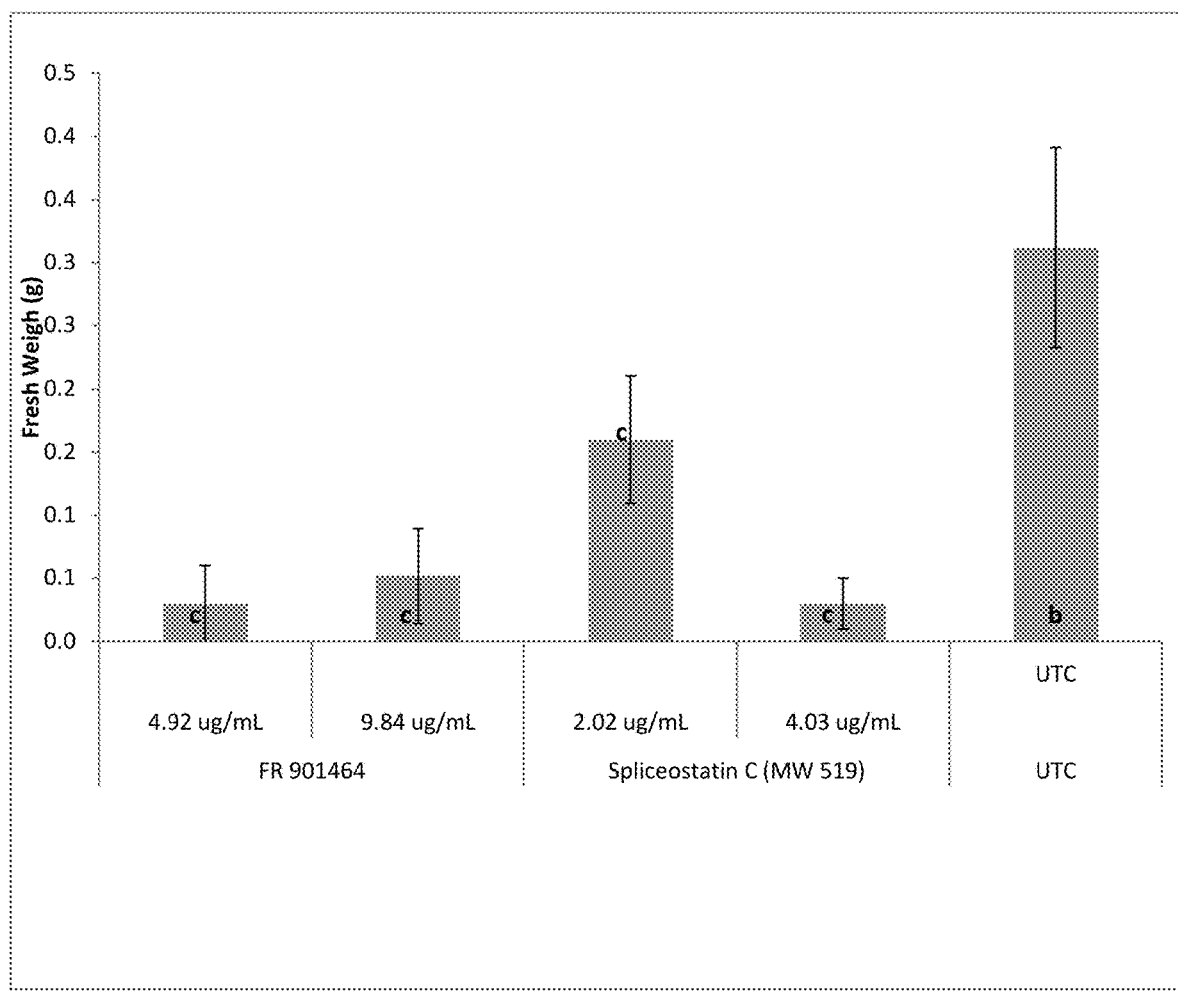
FIG. 2 denotes *Palmer* phytoxicity Test with Y-axis bring fresh weight (g)/Plant evaluation on four leaves *A. palmer* plants 6DAT $p<0.000$ and $Rsq=0.7068$. Error bars represent the standard error. Grouping Information Using Fisher LSD Method and 90% Confidence. UTC=untreated control.
Figure 3:
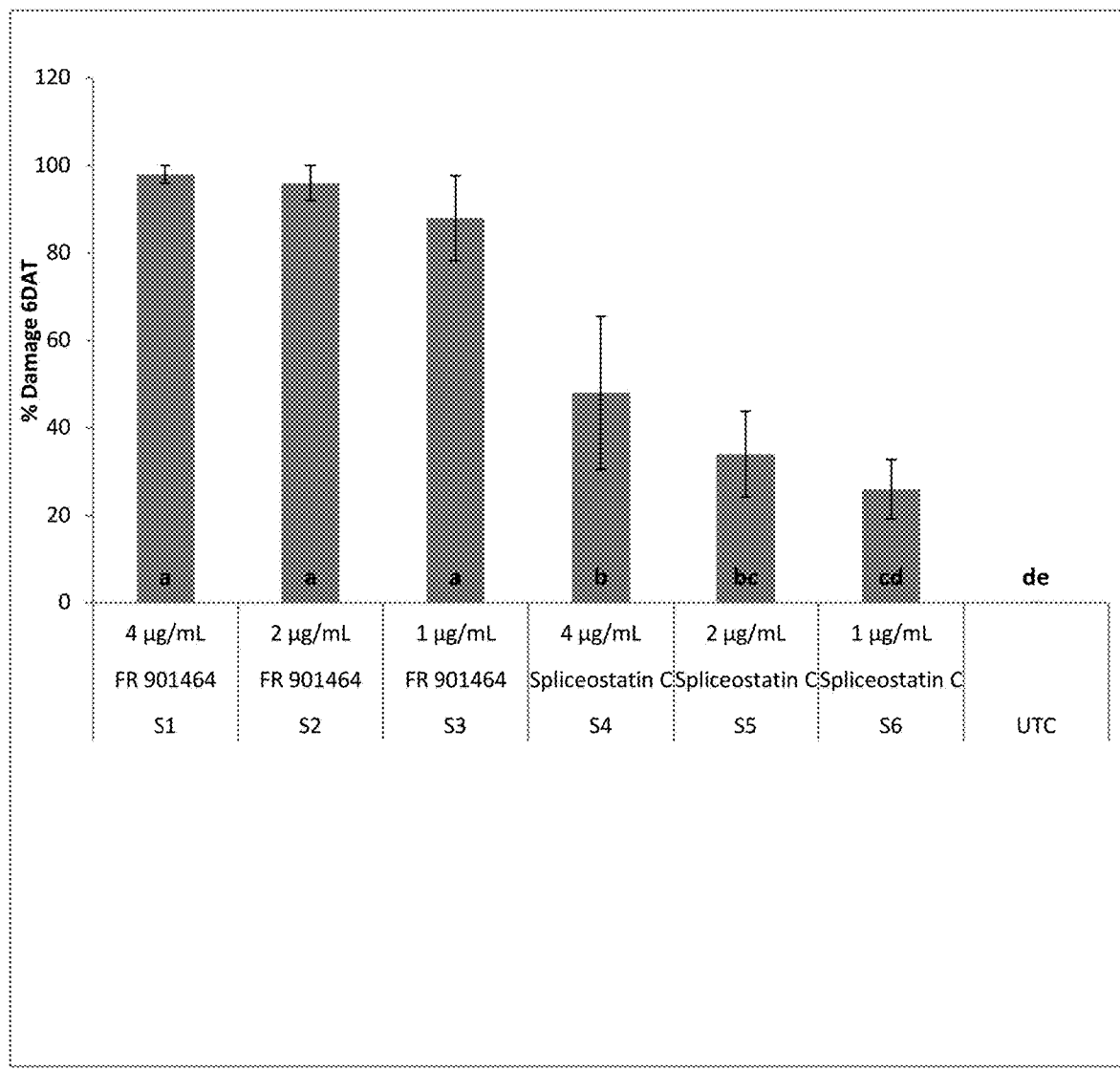
FIG. 3 denotes another *Palmer* phytoxicity Test with Percentage of Damage evaluation on four leaves *A. palmer* plants 6DAT $p<0.000$ and $Rsq=0.7847$. Error bars represent the standard error. Grouping Information Using Fisher LSD Method and 90% Confidence. UTC=untreated control.
Figure 4:
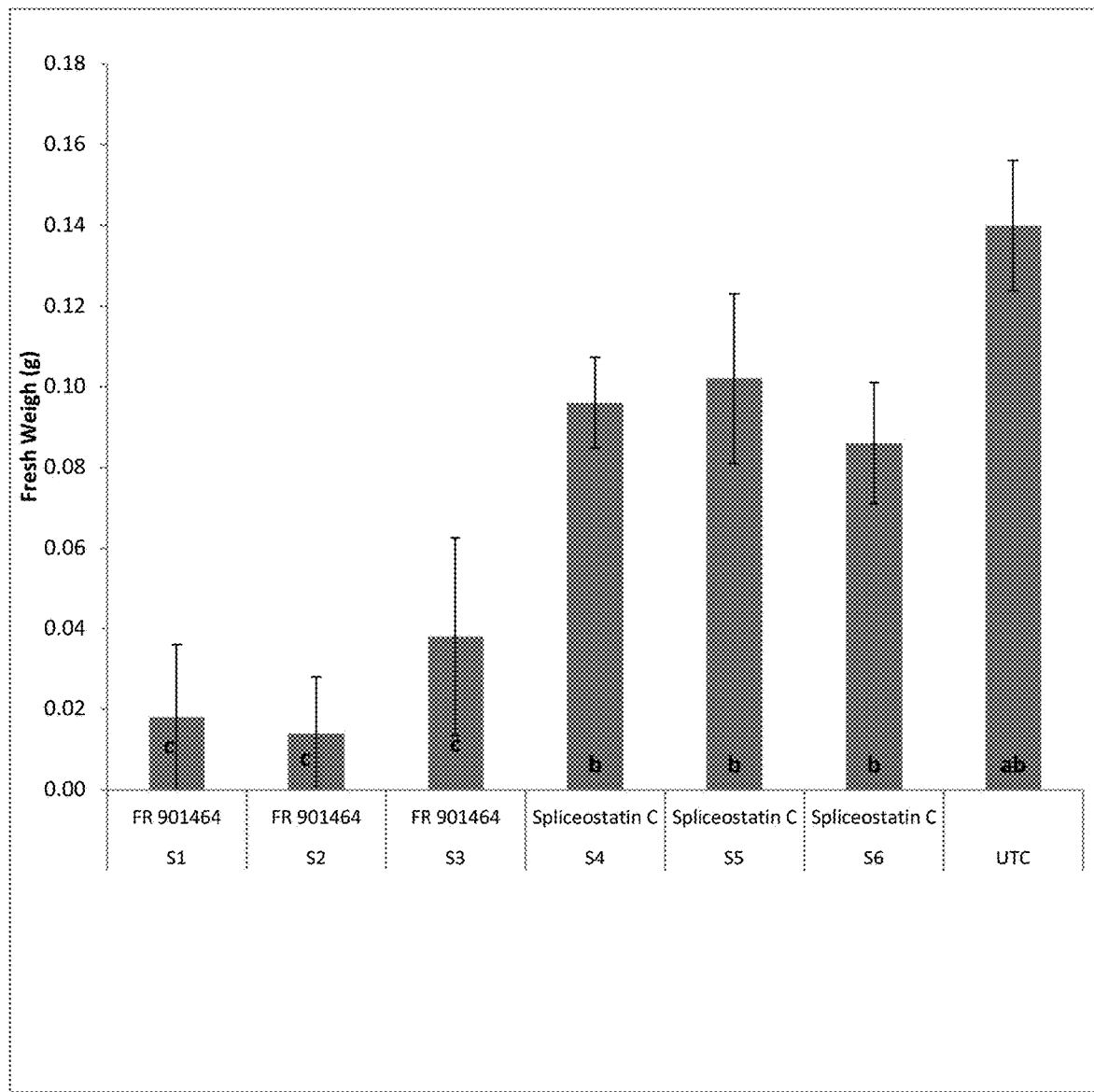
FIG. 4 denotes *Palmer* phytoxicity Test with the same concentration as in FIG. 3. Fresh weight (g)/plant evaluation on four leaves *A. palmer* plants 6DAT $p<0.000$ and $Rsq=0.6305$. Error bars represent the standard error. Grouping information using Fisher LSD Method and 90% confidence. UTC=untreated control.
Figure 5:
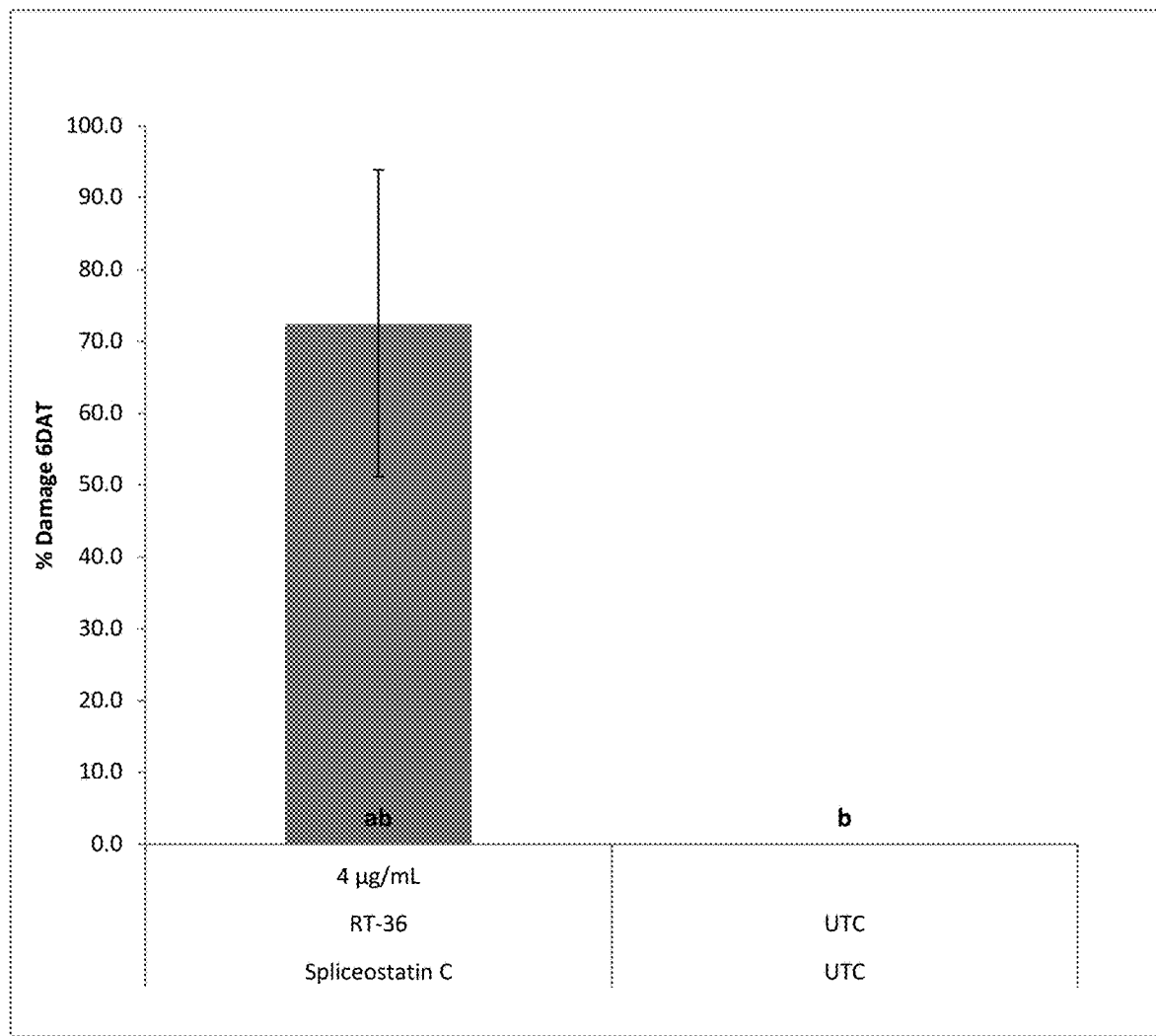
FIG. 5 denotes yet another *Palmer* phytoxicity Test. Percentage of Damage evaluation on four leaves *A. palmer* plants 6DAT $p<0.000$ and $Rsq=0.7239$. Error bars represent the standard error. Grouping Information Using Fisher LSD Method and 90% Confidence. UTC=untreated control.
Figure 6:
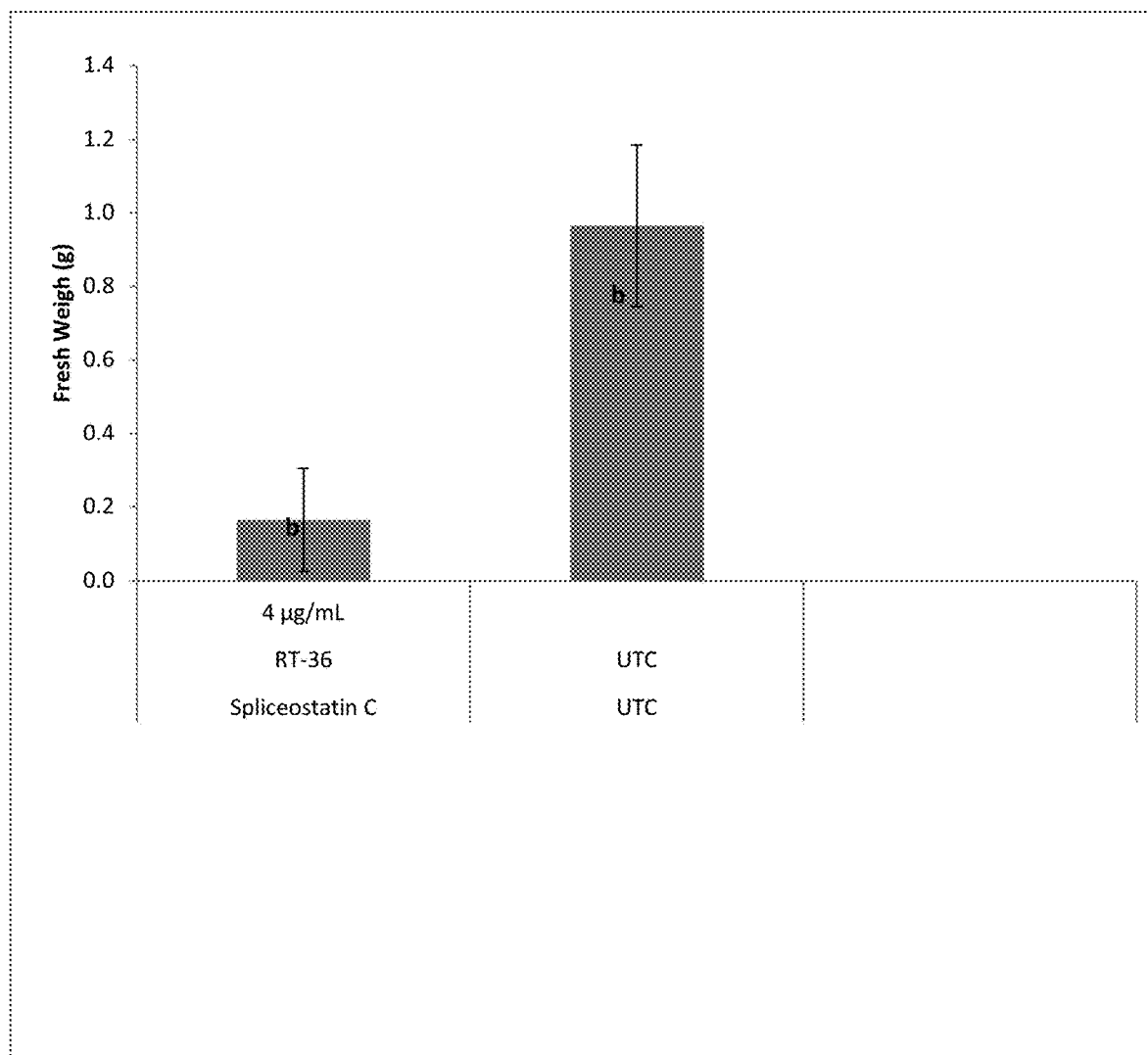
FIG. 6 denotes the same experiment as FIG. 5, but with fresh weight as the Y-axis. Fresh weight (g)/Plant evaluation on four leaves *A. palmer* plants 6DAT $p<0.000$ and $Rsq=0.6330$. Error bars represent the standard error. Grouping Information Using Fisher LSD Method and 90% Confidence. UTC=untreated control.
Figure 7:
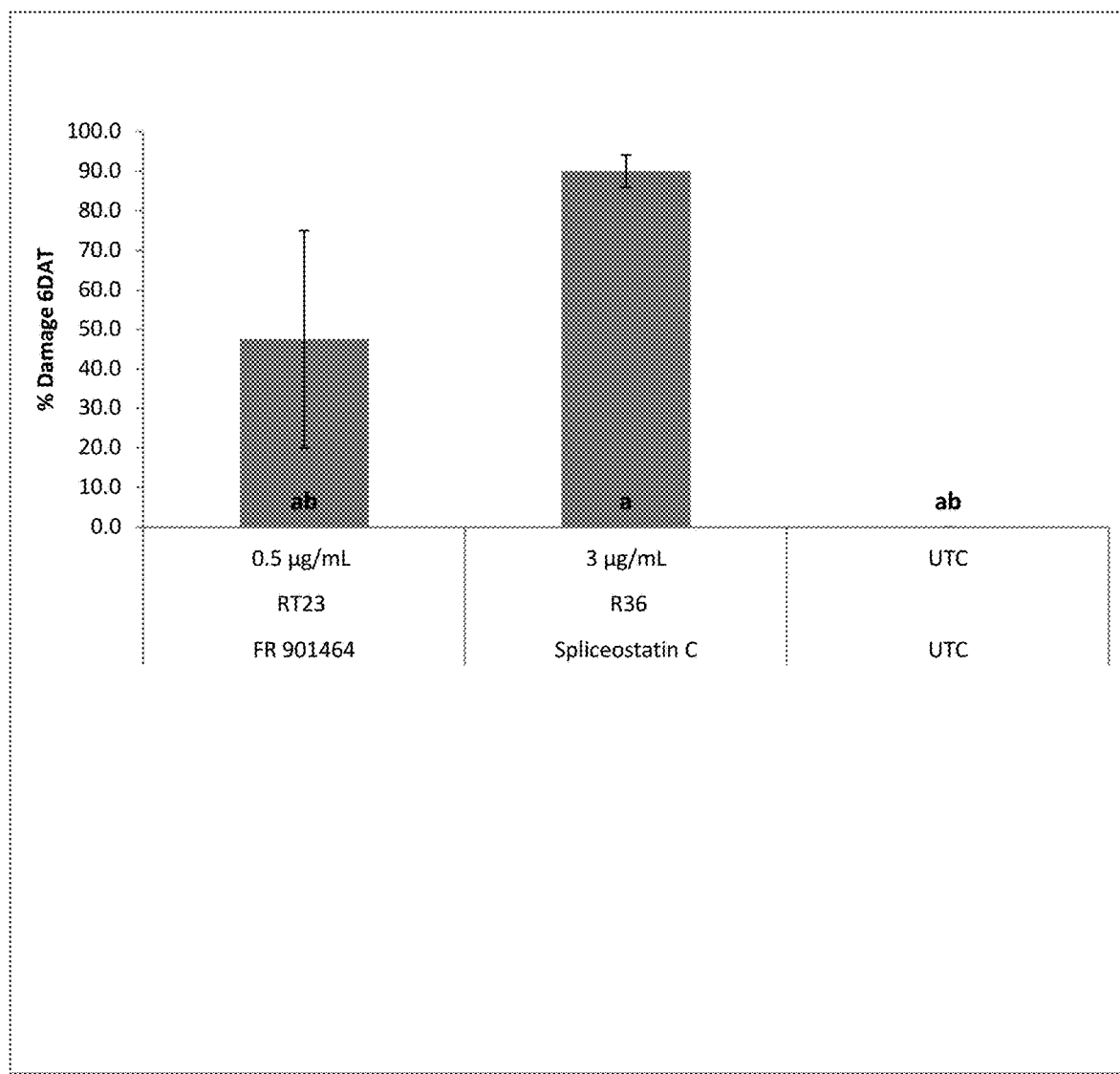
FIG. 7 denotes as yet another *Palmer* phytoxicity Test. Percentage of Damage evaluation on four leaves *A. palmer* plants 6DAT $p<0.000$ and $Rsq=0.6521$. Error bars represent the standard error. Grouping Information Using Fisher LSD Method and 90% Confidence. UTC=untreated control.
Figure 8:
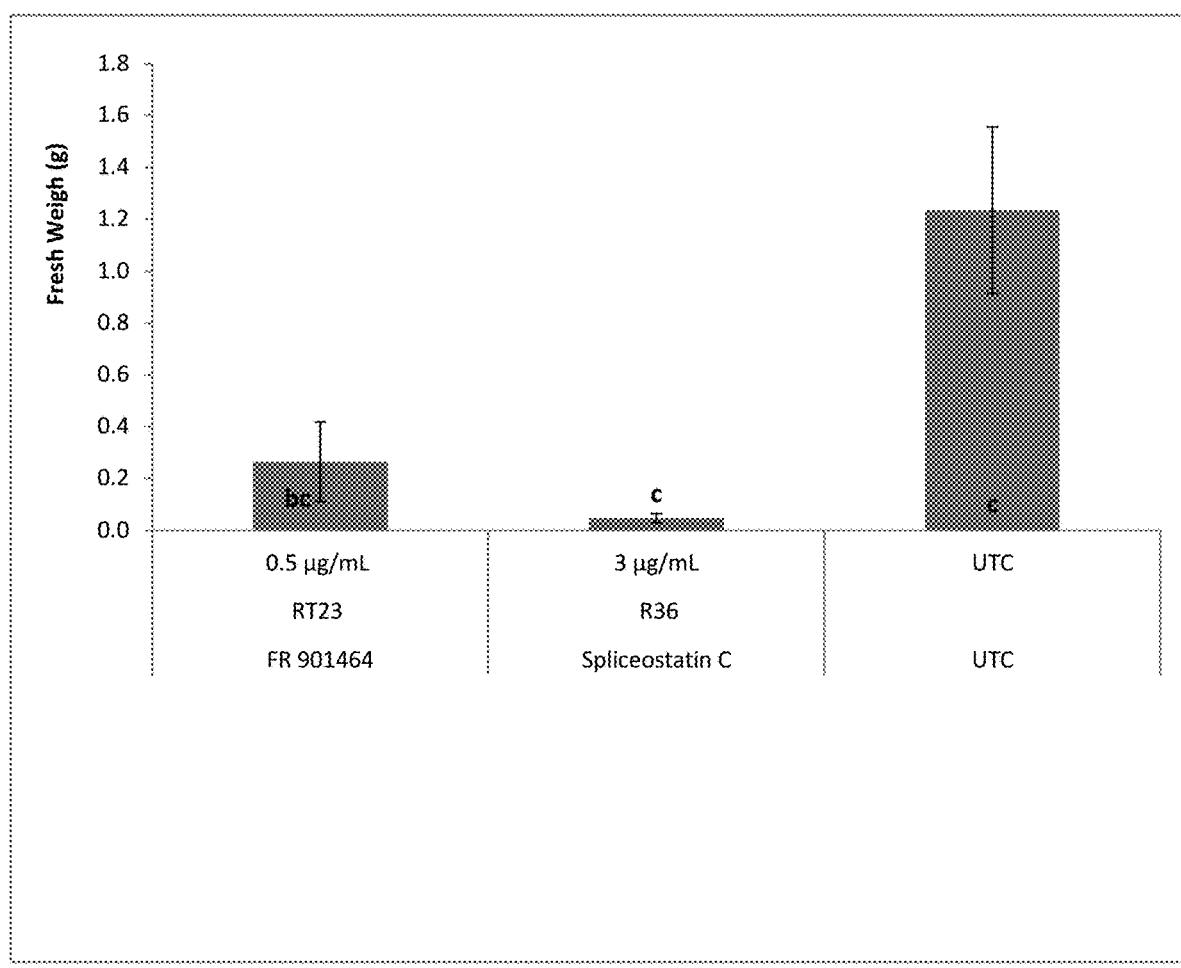
FIG. 8 denotes the same experiment as FIG. 7, but with fresh weight as the Y-axis.
Figure 9:
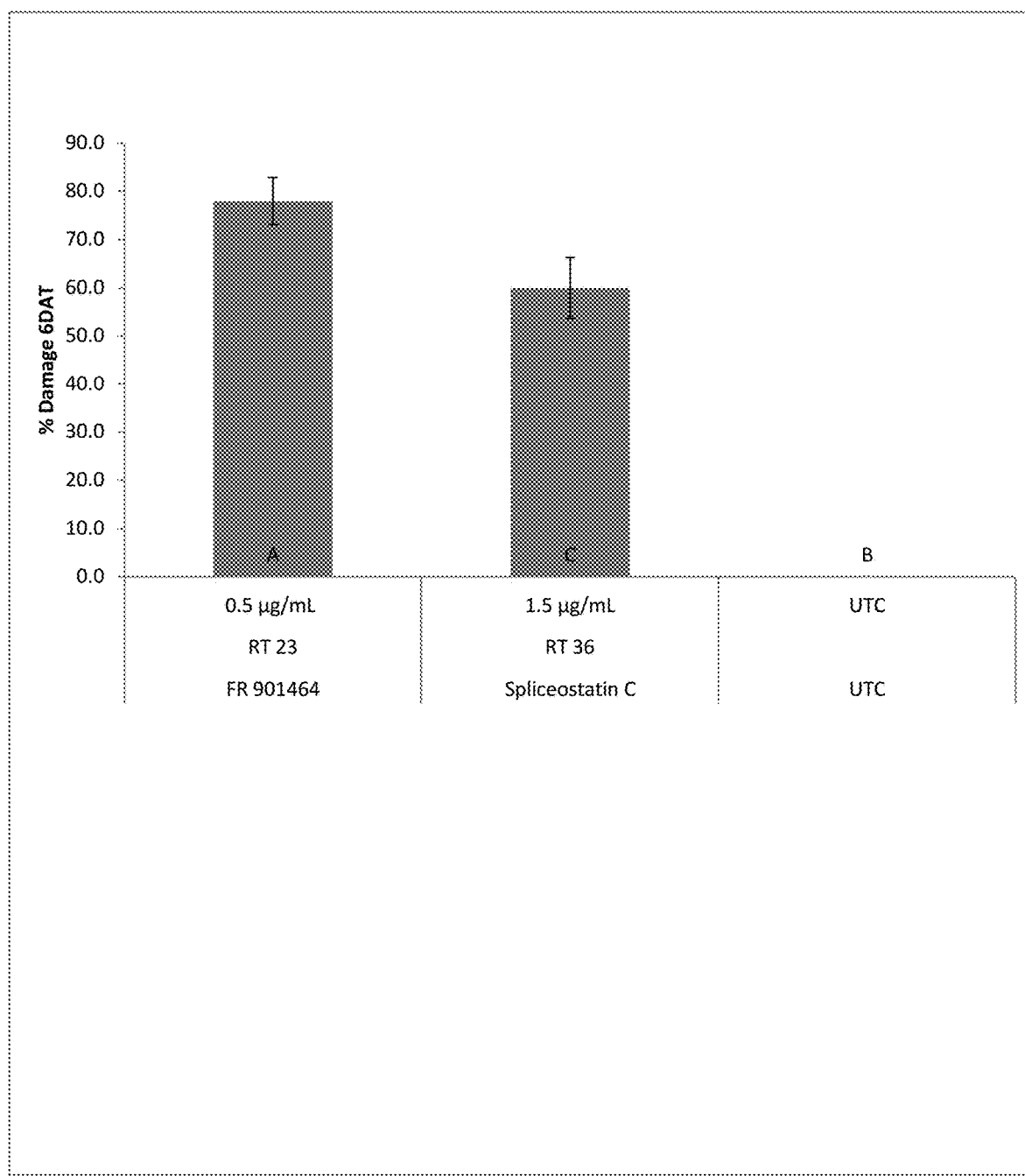
FIG. 9 denotes yet another *Palmer* phytoxicity Test. Percentage of Damage evaluation on four leaves *A. palmer* plants 6DAT $p<0.000$ and $Rsq=0.9061$. Error bars represent the standard error. Grouping Information Using Fisher LSD Method and 95% Confidence. UTC=untreated control.
Figure 10:
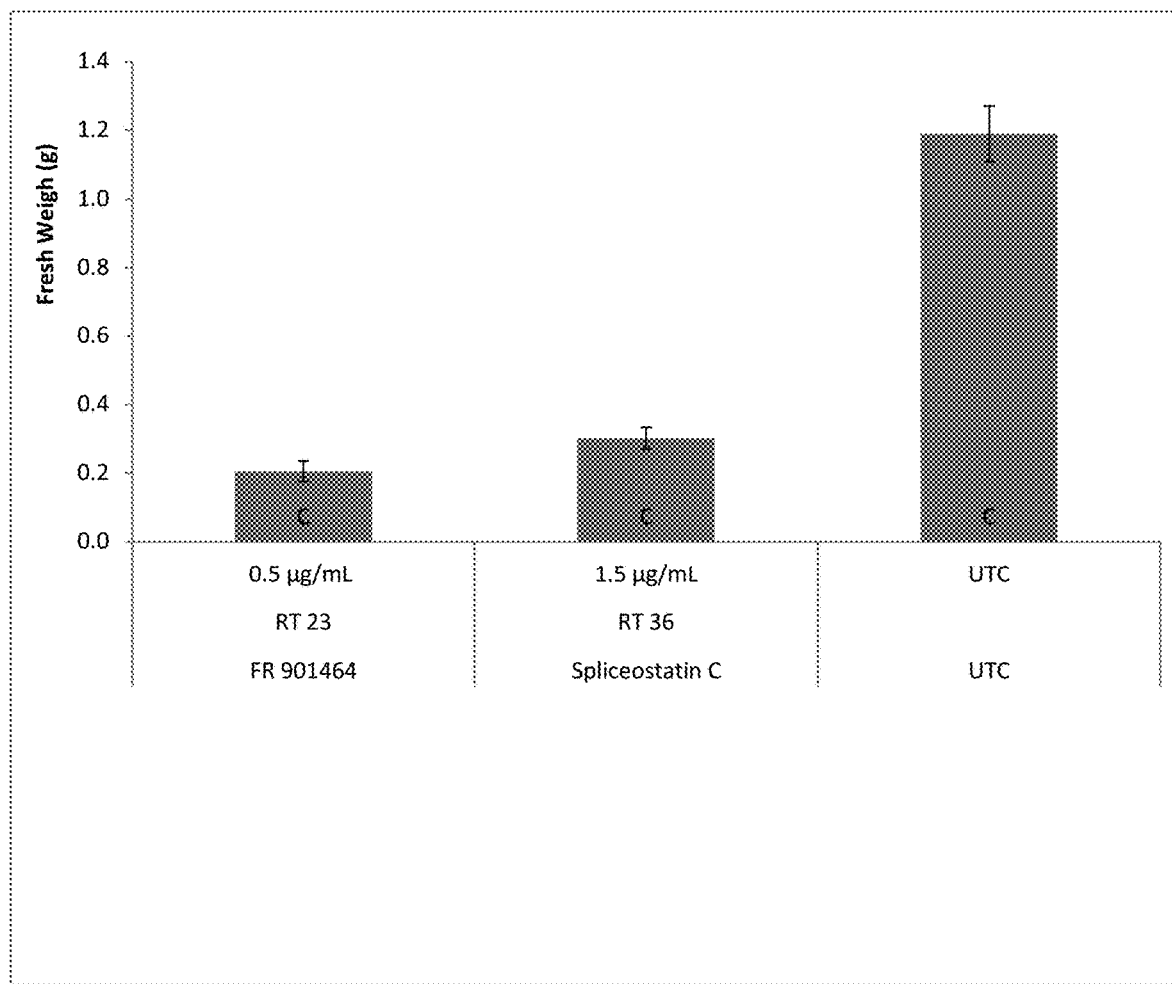
FIG. 10 denotes the same experiment as FIG. 9, but with fresh weight as the Y-axis. Fresh weight (g)/Plant evaluation on four leaves *A. palmer* plants 6DAT $p<0.000$ and $Rsq=0.8359$. Error bars represent the standard error. Grouping Information Using Fisher LSD Method and 95% Confidence. UTC=untreated control.
Figure 11:
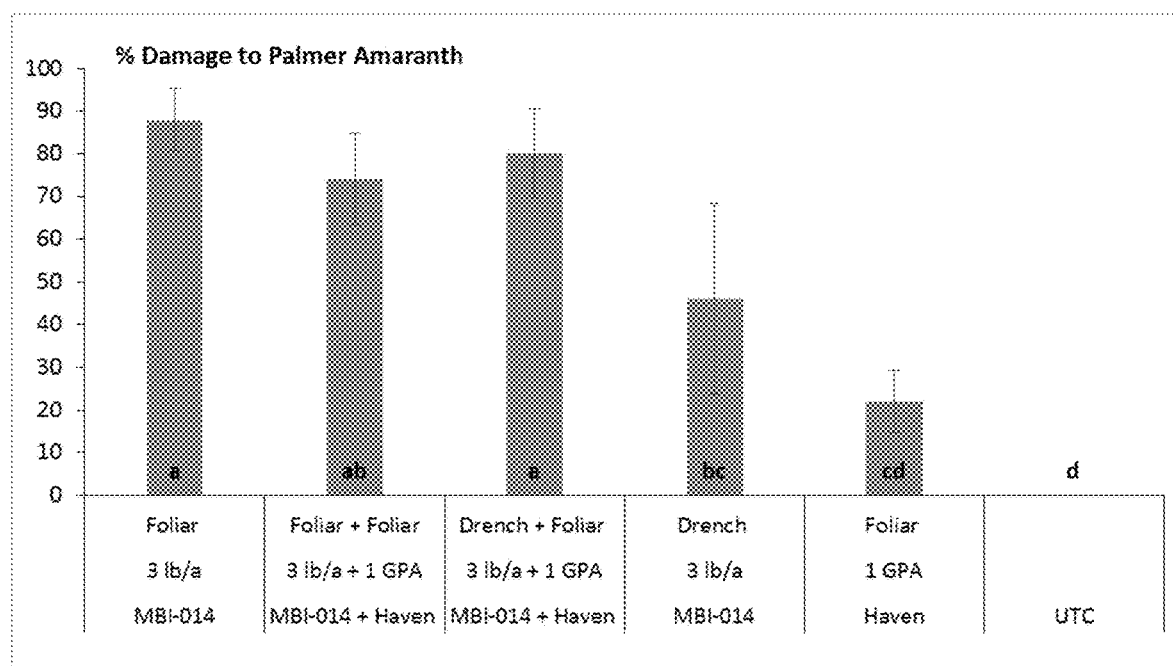
FIG. 11 denotes synergism between stearyl alcohol (HAVEN) and spliceostatin C (MBI-014). UTC=untreated control.

The isolated compounds FR 901464 (RT 23) and Spliceostatin C (MW 519, RT 36) were tested at different concentrations against *Amaranthus palmeri* (*Palmer amaranth*). *Palmer amaranth* plants were grown in a greenhouse to the 3-4 leaf stage in 2.5 cm square pots containing plant growth mix with slow release fertilizer. Treatments were then applied using a research cabinet track sprayer fitted with an 8001 nozzle and at a carrier volume of 20 gal/A. Negative controls (UTC=untreated control) were sprayed with water. Pots were blocked and randomized by treatment after spray and placed outside in the sun, and watered as necessary. Plants were evaluated 6 days after application for visual damage and fresh weight. Data was subjected to ANOVA and means were separated using the Tukey method with 95% confidence intervals. FIGS. 1-10 denote the resulting data. In brief, the molecules are effective herbicidal compounds.

Example 4: Herbicidal Synergism of FR901464 and/or Spliceostatin C (MBI-014) when Applied with Stearyl Alcohol (HAVEN)

*Palmer amaranth* (*Amaranthus palmeri*) plants were grown in a greenhouse to the 3-4 leaf stage in 2.5 cm square pots containing plant growth mix with slow release fertilizer. Treatments were then applied either as a foliar spray using a research cabinet track sprayer fitted with an 8002 nozzle or poured as a 20 mL/pot drench onto the soil surface. MBI-014 was applied at a rate of 3 pounds per acre (lbs/A) and sprayed with 1% v/v organosilicone surfactant at a carrier volume of 40 gallons per acre (GPA); Haven was applied without an adjuvant at 1 GPA and diluted into water for a final spray volume of 100 GPA; negative controls were sprayed with water. When both products were sprayed onto a plant, MBI-014 was applied first, allowed to dry, then followed by the spray of Haven. Treatments were replicated 5 times. Pots were blocked and randomized by treatment after spray and placed in a greenhouse at 25° C. and 50% RH, and watered as necessary. Plants were evaluated 6 days after application for visual damage. Data was subjected to ANOVA and means were separated using the Fisher LSD method with 90% confidence intervals.

Results: Applying Haven to leaves after applying MBI-014 to leaves did not increase the severity of herbicidal symptoms in the plants (74%), compared to applying MBI-014 by itself (88%). However, when MBI-014 was applied as a drench and Haven applied to leaves, damage to plants increased significantly (80%) compared to plants treated with a drench alone (46%). Using the Colby synergy equation, where a value of 1 denotes neutrality, below one denotes antagonism and above 1 denotes synergy, the drench+spray treatment produces a score of 1.38, falling into the category of synergism. Since the present disclosure has established that foliar applications of Haven can increase transpiration rates in plants, it appears that the reason for this synergistic efficacy is that the enhanced plant transpiration due to Haven causes plants to pull in more MBI-014 from the soil into roots and up the plant vascular system, thereby exposing larger areas of the affected plant to greater quantities of the herbicide.

Deposit of Biological Material. The following biological material has been deposited under the terms of the Budapest Treaty with the Agricultural Research Culture Collection (NRRL), 1815 N. University Street, Peoria, Ill. 61604 USA, and given the following number:

| Deposit Accession Number | Date of Deposit |
|---|---|
| *Burkholderia* sp. A396 (NRRL B-50319) | Sep. 15, 2009 |

The strain has been deposited under conditions that assure that access to the culture will be available during the pendency of this patent application to one determined by the Commissioner of Patents and Trademarks to be entitled thereto under 37 C.F.R. § 1.14 and 35 U.S.C. § 122. The deposit represents a substantially pure culture of the deposited strain. The deposit is available as required by foreign patent laws in countries wherein counterparts of the subject application, or its progeny are filed. However, it should be understood that the availability of a deposit does not constitute a license to practice the subject invention in derogation of patent rights granted by government action.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method for inhibiting emergence or growth of monocotyledonous, sedge or dicotyledonous weeds comprising:
    applying a composition of:
    (a) an effective amount of spliceostatin C; and
    (b) at least one of a carrier, diluent, surfactant, or adjuvant; to inhibit growth of said weed.

2. The method of claim 1, wherein said monocotyledonous, sedge or dicotyledonous weeds are selected from the group consisting of *Amaranthus hypochondriacus, Chenopodium album, Abutilon theophrasti, Helianthus annuus, Ambrosia artemesifolia, Amaranthus retroflexus, Convolvulus arvensis, Brassica kaber, Taraxacum officinale, Solanum nigrum, Malva neglect, Setaria lutescens, Bromus tectorum, Poa annua, Poa pratensis*, Palmer amaranth, *Lolium perenne* L. var. Pace, *Festuca arundinaceae* Schreb. Var. Aztec II, Anthem II, LS1100, *Echinochloa crus-galli*, and *Lactuca sativa*.

3. The method of claim 1, wherein said composition further comprises another herbicidal compound or pesticide compound.

4. The method of claim 3, wherein said another herbicidal compound comprise clove, cinnamon, lemongrass, citrus oils, orange peel oil, tentoxin, cornexistin, AAL-toxin, leptospermone, thaxtomin, sarmentine, momilactone B, sorgoleone, ascaulatoxin and ascaulatoxin aglycone, diflufenzopyr and salts thereof, dicamba and salts thereof, topramezone, tembotrione, S-metolachlor, atrazine, mesotrione, primisulfuron-methyl, 2,4-dichlorophenoxyacetic acid, nicosulfuron, thifensulfuron-methyl, asulam, metribuzin, diclofop-methyl, fluazifop, fenoxaprop-p-ethyl, asulam, oxyfluorfen, rimsulfuron, mecoprop, and quinclorac, thiobencarb, clomazone, cyhalofop, propanil, bensulfuron-methyl, penoxsulam, triclopyr, imazethapyr, halosulfuron-methyl, pendimethalin, bispyribac-sodium, carfentrazone ethyl, sodium bentazon/sodium acifluorfen, glyphosate, glufosinate, stearyl alcohol, and/or orthosulfamuron.

5. The method of claim 1, wherein said spliceostatin C is isolated from *Burkholderia* sp.

6. The method of claim 5, wherein said *Burkholderia* sp. is *Burkholderia* A396 (NRRL Accession No. B-50319).

7. The method of claim 1, wherein said composition further comprises a salt or stereoisomer of spliceostatin C.

8. A synergistic herbicidal composition comprising: (a) spliceostatin C; and (b) another herbicide select from the group consisting of clove, cinnamon, lemongrass, citrus oils, orange peel oil, tentoxin, cornexistin, AAL-toxin, leptospermone, thaxtomin, sarmentine, momilactone B, sorgoleone, ascaulatoxin and ascaulatoxin aglycone, diflufenzopyr and salts thereof, dicamba and salts thereof, topramezone, tembotrione, S-metolachlor, atrazine, mesotrione, primisulfuron-methyl, 2,4-dichlorophenoxyacetic acid, nicosulfuron, thifensulfuron-methyl, asulam, metribuzin, diclofop-methyl, fluazifop, fenoxaprop-p-ethyl, oxyfluorfen, rimsulfuron, mecoprop, and quinclorac, thiobencarb, clomazone, cyhalofop, propanil, bensulfuron-methyl, penoxulam, triclopyr, imazethapyr, halosulfuron-methyl, pendimethalin, bispyribac-sodium, carfentrazone ethyl, sodium bentazon/sodium acifluorfen, glyphosate, glufosinate, and orthosulfamuron.

9. A method for inhibiting emergence or growth of monocotyledonous, sedge or dicotyledonous weeds comprising:

applying the synergistic composition of claim 8 to said weed, effective to inhibit the emergence of said weed.

10. The method of claim 9, wherein the application method is via a tank mix.

11. The method of claim 10, wherein the application method is via rotation.

\* \* \* \* \*